US012438425B2

(12) United States Patent
Homann et al.

(10) Patent No.: US 12,438,425 B2
(45) Date of Patent: Oct. 7, 2025

(54) ELECTRIC ENGINE FOR A CHARGING DEVICE AND PRODUCTION METHOD

(71) Applicant: BorgWarner Inc., Auburn Hills, MI (US)

(72) Inventors: Kai Homann, Mainz (DE); Thomas Glaß, Rockenhausen (DE)

(73) Assignee: BorgWarner Inc., Auburn Hills, MI (US)

( * ) Notice: Subject to any disclaimer, the term of this patent is extended or adjusted under 35 U.S.C. 154(b) by 407 days.

(21) Appl. No.: 17/817,667

(22) Filed: Aug. 5, 2022

(65) Prior Publication Data
US 2023/0050563 A1    Feb. 16, 2023

(30) Foreign Application Priority Data

Aug. 10, 2021   (DE) .......................... 102021120803.3

(51) Int. Cl.
| H02K 16/04 | (2006.01) |
| H02K 1/16 | (2006.01) |
| H02K 1/20 | (2006.01) |
| H02K 3/28 | (2006.01) |
| H02K 7/08 | (2006.01) |
| H02K 15/12 | (2006.01) |

(52) U.S. Cl.
CPC ............. *H02K 16/04* (2013.01); *H02K 1/165* (2013.01); *H02K 1/20* (2013.01); *H02K 3/28* (2013.01); *H02K 7/08* (2013.01); *H02K 15/12* (2013.01)

(58) Field of Classification Search
CPC ........... H02K 16/04; H02K 1/165; H02K 7/08
See application file for complete search history.

(56) References Cited

U.S. PATENT DOCUMENTS

| 2011/0101818 A1* | 5/2011 | Lokhandwalla ....... H02K 1/148 310/216.098 |
| 2012/0256514 A1* | 10/2012 | Junak ..................... H02K 1/146 310/216.092 |
| 2018/0306209 A1* | 10/2018 | Nejedly .............. F04D 29/4206 |
| 2022/0094223 A1* | 3/2022 | Schwanemann ......... H02K 1/20 |

FOREIGN PATENT DOCUMENTS

GB     2479719    * 10/2011

OTHER PUBLICATIONS

Stator Teeth (Year: 2025).*

* cited by examiner

*Primary Examiner* — Sean Kayes
(74) *Attorney, Agent, or Firm* — Howard & Howard Attorneys PLLC

(57) ABSTRACT

A stator arrangement for an electric engine having an inner rotor. The present invention furthermore relates to an electric engine for a charging device, in particular for an internal combustion engine or a fuel cell, having such a stator arrangement. The stator arrangement comprises an outer stator core with electrical windings, and a separate inner stator core, which is arranged inside the outer stator core and is designed to receive the rotor. The outer stator core defines a first inner diameter, which is dimensioned in such a way that a bearing unit of the electric engine can be guided through the outer stator core. An outer diameter of the inner stator core substantially corresponds to the first inner diameter, wherein the inner stator core is designed to extend a magnetic flux in the radial direction during operation. The invention furthermore relates to a method for producing the electric engine.

11 Claims, 11 Drawing Sheets

ELECTRIC ENGINE FOR A CHARGING DEVICE AND PRODUCTION METHOD

CROSS-REFERENCE TO RELATED APPLICATIONS

This application claims priority pursuant to 35 U.S.C. 119(a) to Germany Patent Application No. 102021120803.3, filed Aug. 10, 2021, which application is incorporated herein by reference in its entirety.

TECHNICAL FIELD

The present invention relates to a stator arrangement for an electric engine of a charging device, and the electric engine and the charging device themselves. Furthermore, the invention relates to a production method for such an electric engine.

BACKGROUND

More and more vehicles of more recent generations are equipped with charging devices in order to meet requirement targets and legal requirements. When developing charging devices, it is important to optimize both the individual components and the system as a whole with regard to their reliability and efficiency.

Known charging devices usually have at least one compressor with a compressor wheel, which is connected to a drive unit via a common shaft. The compressor compresses the fresh air drawn in for the internal combustion engine or for the fuel cell. This increases the amount of air or oxygen that the engine has available for combustion or the fuel cell has available for reaction. This in turn leads to an increase in performance of the internal combustion engine or the fuel cell. Charging devices can be equipped with different drive units. In the prior art, in particular, e-chargers, in which the compressor is driven by an electric engine, and turbochargers, in which the compressor is driven by a turbine, are known. Combinations of both systems are also described in the prior art, for example as an electrically assisted turbocharger or eTurbo. Furthermore, multi-stage systems are known in which charging devices of different or identical designs are connected in series or in parallel.

In particular, electrically assisted turbochargers and e-chargers rotate at very high speeds of up to 60,000 to 250,000 rpm. Here, the rotating electromagnetically active element of the electric engine is fixed on a common shaft with the compressor wheel and, in the case of an electrically assisted turbocharger, on a common shaft with the compressor wheel and the turbine wheel, and is collectively referred to as the rotor. Here, the compressor wheel is arranged at a first end of the shaft in a compressor chamber of a compressor housing, and the middle part of the shaft or the rotor with the electromagnetically active material is arranged in a bearing housing or an engine housing. In the case of an electrically assisted turbocharger, the turbine wheel arranged at the end of the shaft opposite the compressor wheel is arranged in a turbine chamber of a turbine housing. A bearing arrangement in the motor housing with two radial bearings (also known as bearing units) and an axial bearing on both sides is usually used to securely support the shaft. The radial bearings are each arranged in the motor housing on axially opposite sides of the rotor or of the electromagnetically active element. The stator of the electric engine is fixed in the motor housing radially outside the rotor or the electromagnetically active element. In order to keep lubricants or other fluids away from the rapidly rotating rotor and thus to avoid dynamic imbalance and/or rubbing of the rotor and thus damage during operation, it is known to keep a radially inner area of the winding slots of the stator free for the lubricant removal from the rapidly rotating rotor shaft to keep free. A disadvantage of known electric engines for charging devices is the complex and laborious manufacture of the electric engine and its components due to the limited installation space available, as well as efficiency losses and high costs associated therewith.

The object of the present invention is to provide an improved electric engine for charging devices.

SUMMARY OF THE INVENTION

The present invention relates to a stator arrangement for an electric engine, as well as an electric engine having a corresponding stator arrangement, and a charging device having a corresponding electric engine. Furthermore, the present invention relates to a method for producing an electric engine for a charging device.

The stator arrangement for an electric engine having an internal rotor comprises an outer stator core and a separate inner stator core. The outer stator core comprises electrical windings or is wound with electrical windings. The inner stator core is arranged inside the outer stator core and is designed to receive the rotor. The outer stator core defines a first inner diameter. The first inner diameter is dimensioned in such a way that a bearing unit of the electric engine can pass through the outer stator core. An outer diameter of the inner stator core substantially corresponds to the first inner diameter. The inner stator core is designed to lengthen a magnetic flux path in a radial direction during operation. The stator arrangement divided into an inner and outer stator core results in technical assembly advantages during assembly of the stator arrangement or during installation in a housing of an electric engine or a charging device due to the larger inner diameter available in the meantime, in particular the first inner diameter, in comparison to a one-piece stator assembly in which the stator teeth project further radially inwards in order to receive or to guide the rotor or electromagnetically active material. By specifically selecting the first inner diameter to be larger than a maximum outer diameter of the bearing unit, the excess force when the bearing is readjusted can be reduced, since the bearing unit, in the event of a defect, such as an imbalance for example, can simply be removed again from the (electric engine) housing through the outer stator core and replaced or readjusted. In comparison to this, in the case of a one-piece stator arrangement, the inside diameter of which is usually smaller than the outer diameter of the bearing unit, non-destructive removal of the stator parts cannot be implemented after gluing in, in particular after balancing. In the stator arrangement according to the invention, the inner stator core or the inner stator group can be removed in a simple but effective manner, and the bearing unit to be replaced or readjusted can then be removed through the first inner diameter of the outer stator core without having to remove the outer stator core from the housing. A further advantage of the stator arrangement according to the invention is that it enables direct encapsulation of the outer stator core in the (engine) housing without contaminating the bearing (or bearing units), since the bearing units can only be inserted into the housing after the outer stator core has been encapsulated. Thus, the present stator arrangement allows a simpler and more cost-effective assembly of an electric engine or installation in an electric engine housing than with a one-piece stator arrangement.

Due to the possibility of direct encapsulation in the housing, the heat conduction properties and the cooling can additionally be optimized, for example by avoiding or reducing air pockets between the housing and the stator arrangement or the wound outer stator core. The division into an outer stator core with the windings required for the electric engine and an inner stator core additionally makes it possible to provide a generic outer stator core or a generic outer stator group. An outer stator group is to be understood as meaning an outer stator core wound with electrical windings and cast. Such a generic outer stator core or generic outer stator group can be used for different fields of application (e.g. different speeds), since a different rotor size can be compensated for by a simple adjustment of the inner stator core, wherein the outer stator core or stator group can maintain its dimensions. As a result, production and cost advantages as well as a reduction in production time can be achieved due to large quantities.

In designs of the stator arrangement, the outer stator core can include a radially outer stator ring and a plurality of stator teeth. The plurality of stator teeth can protrude radially inwardly from the stator ring, distributed in the peripheral direction. The stator teeth can preferably be arranged distributed at regular intervals in the peripheral direction. Here, the stator teeth, in particular their radially inner ends, define the first inner diameter. In particular, the stator teeth can be integrally connected to the stator ring. The stator teeth can preferably be punched out in one piece with the stator ring and, optionally, assembled as a laminated stator packet. Alternatively or additionally, the outer stator core may include a plurality of slots. The slots may each be formed between adjacent stator teeth. In particular, the slots can be arranged so that they open radially inwardly or can be formed radially inwardly between adjacent stator teeth. The electrical windings can be arranged in the slots. In particularly preferred designs, the electrical windings, in particular with the exception of the winding heads, can be arranged only or exclusively in the slots of the outer stator core. In other words, the windings can be arranged only or exclusively on or in the outer stator core. Expressed differently, the windings may not be arranged in the inner stator core. The winding heads can protrude axially from the slots on both sides. The stator arrangement with divided stator cores results in the advantage that the slots in the outer stator core can be formed with larger slot openings, in particular with a larger opening width in the peripheral direction. The larger slots and the more flexible design freedom of the slots in the outer stator core mean that a simplified winding can be achieved, since the electrical windings can be fed through the wide slots more easily than through narrow slots, as is usually the case with conventional one-piece stator arrangements. This is possible because the inner stator core can provide narrow slot openings favorable for reducing the pulsation losses of the magnetic field, in particular of the rotor, radially inside the outer stator core.

In designs of the stator arrangement, the outer stator core can be cast together with the electrical windings to form an outer stator group. In particular, the outer stator core can be cast together with the electrical windings to form an outer stator group in a vacuum casting. Alternatively or additionally, the outer stator group can include a casting material, for example epoxy resin, which is optionally provided with thermally conductive fillers. The split stator arrangement according to the invention allows the casting of the entire outer stator core with the windings without any complex retaining devices for the electrical windings, which are required, for example, in a conventional one-piece stator arrangement in order to hold the electrical windings in the radially outer area of the slots, so that lubricant channels required for the outflow of lubricant remain formed in the radially inner region of the grooves. In particular, no additional material is required to be pushed into the grooves to support the cover slides. In addition, the cover slides can be made thinner than in conventional systems, since the slot opening relevant for winding, i.e. the slot opening of the slots in the outer stator core, can be optimized for the cover slide hold and winding, substantially independently of losses, for example pulsation losses. This is made possible by the separate inner stator core, which in turn can be optimized to reduce any losses, particularly pulsation losses (regardless of winding or shroud restrictions). Overall, faster and more cost-effective casting can be achieved with simpler casting tools, particularly in the case of an eTurbo arrangement.

In designs of the stator assembly that can be combined with any of the previous designs, the inner stator core may include a plurality of stator tooth extensions. The stator tooth extensions may be arranged distributed in the peripheral direction and extend from the outer diameter to a second inner diameter. The second inner diameter can preferably be smaller than an outer diameter of the bearing unit of the electric engine. In designs, the stator tooth extensions can be arranged distributed at regular intervals in the peripheral direction. In designs, the second inner diameter can be designed to accommodate or guide the rotor of the electric engine. In particular, the second inner diameter can be designed to guide the rotor of the, in particular fast-rotating, electric engine with a small gap (in relation to other electric engine applications than in charging devices, in particular slower-rotating electric engines, larger gap). The number of stator tooth extensions can preferably correspond to the number of stator teeth.

In designs that can be combined with the preceding designs, lubricant channels with radially inner channel openings can be formed in the peripheral direction between adjacent stator tooth extensions. Due to the separate inner stator core, in which no windings are arranged, the slot opening or the channel openings in the inner stator core can be made smaller, since no electrical windings have to be inserted here. As a result, pulsation losses in the magnetic field, in particular in the rotor, can be reduced. In designs, the lubricant channels can run over an entire axial length of the stator tooth extensions. The lubricant channels can serve as drainage to keep lubricant or other fluids away from the rapidly rotating rotor and thus to avoid damage during operation. As a result, the risk that fluids in the gap between the rotor and the inner stator core can lead to an imbalance and/or rubbing and thus to a failure at high speeds can be avoided or at least reduced. The placement of the lubricant ducts in the separate inner stator core enables the lubricant ducts to be manufactured more easily in comparison to a one-piece stator core, in which the lubricant ducts would have to be kept free during casting using complex retaining tools. Furthermore, the reworking and cleaning that would otherwise be necessary can be omitted or at least reduced in order to remove flakes and other impurities.

In designs of the stator arrangement which can be combined with the preceding designs, the stator arrangement can furthermore comprise a retaining ring connected to the inner stator core. The retaining ring can be arranged and configured to hold the stator tooth extensions distributed in the peripheral direction. In particular, the retaining ring can here hold the stator tooth extensions in a radially outer region. In particular, the retaining ring may be configured in such a way that lubricant channels are formed between a radially inner region of the retaining ring and respectively adjacent stator tooth extensions. The retaining ring can simplify the placement and positioning of the inner stator core in the outer stator core. In particular, the placement and positioning of the stator tooth extensions can be simplified. In designs, the retaining ring can be made of a non-ferritic material and/or non-electrically conductive material. In particular, the retaining ring can be made of a plastic material. Alternatively or additionally, the inner stator core can be overmolded with a non-ferritic material and/or non-electrically conductive material, in particular with a plastic material, in order to form the retaining ring. The material of the retaining ring is particularly preferably a non-electrically conductive material in order to avoid or reduce eddy currents. In embodiments, the material of the retaining ring can include or be made of polytrimethylene terephthalate (PPT) and/or polyphenylene sulfide (PPS), for example. In addition, the material of the retaining ring can include fillers, for example a glass fiber content. Alternatively, the material of the retaining ring may include or be made of a resin material, for example. The retaining ring allows gaps between the stator tooth extensions to be filled with the material of the retaining ring in a radially outer region and provides a secure hold for the stator tooth extensions. In addition, a tight delimitation of the lubricant channels can be achieved.

In designs of the stator arrangement which can be combined with the preceding designs, the inner stator core can be manufactured from a laminated core, in particular from an iron core. In addition, radially inner ends of the stator tooth extensions of at least one sheet of the laminated core can be connected in the peripheral direction by holding webs. Orientation of the stator tooth extensions between the outer diameter and the second inner diameter can be ensured by the holding webs. Furthermore, the retaining webs can simplify the production of the inner stator group, in particular a simplified assembly or joining of the inner stator core with the retaining ring.

In designs of the stator arrangement which can be combined with the preceding designs, a pole shoe for retaining the electrical windings in the slots can be formed on the radially inner ends of the stator teeth. Alternatively or additionally, the pole pieces may be configured to receive a respective cover slide for retaining the electrical windings in the slots. The pole shoes can improve the security of the electrical windings in the radially outer region of the slots compared to a one-piece stator core that has no pole shoes between the radially outer and radially inner areas of the slots. The pole shoes not only fulfil one mechanical function for a possible cover slide—the pole shoes can also have a larger cross-sectional area, particularly when seen in the peripheral direction, in order to reduce the magnetic impedance of a joint gap between the stator laminations.

In designs of the stator arrangement which can be combined with the preceding designs, an inner pole shoe can be formed on the radially inner ends of the stator tooth extensions. Alternatively or additionally, an outer pole shoe can be formed at the radially outer ends of the stator tooth extensions. With separate radially inner pole shoes on the separate inner stator core, a smaller distance between adjacent pole shoes in the peripheral direction can be chosen than with pole shoes of a one-piece stator core, in which windings have to be passed through slots between the pole shoes. In this way, an optimization of the magnetic properties of the stator or the electric engine can be achieved through reduced pulsation losses of the magnetic field. In particular, the rotor losses and thus the rotor temperature can be reduced as a result.

In designs of the stator arrangement which can be combined with either of the two preceding designs, the pole shoes of the stator teeth can have a greater width in the peripheral direction than the outer pole shoes of the stator tooth extensions. As a result, an improvement in the magnetic flux path can be achieved even when the inner stator core is not precisely rotationally aligned with respect to the outer stator core. In other words, tolerance compensation can be achieved in this way.

In designs of the stator arrangement that can be combined with any of the preceding designs, the outer stator core can be made up of laminated layers of a ferritic material, in particular a ferrous material. Alternatively or additionally, the inner stator core can be made up of laminated layers of a ferritic material, in particular a ferrous material.

The present invention further relates to an electric engine for a charging device or for a drive unit. The electric engine comprises the stator arrangement according to any one of the preceding designs, as well as a housing and a housing cover. Furthermore, the electric engine includes a rotor with a shaft and an electromagnetically active element fastened to the shaft. The electric engine comprises a first bearing unit that is accommodated in a bearing bore of the housing cover on one side of the rotor. Furthermore, the electric engine comprises a second bearing unit, which is accommodated in a bearing bore of the housing on an opposite side of the rotor. Due to the fact that the first inner diameter of the outer stator core is dimensioned in such a way that the second bearing unit can be passed through it, the balancing waste can be reduced when the bearing is readjusted, since the second bearing unit, in the event of a defect such as an imbalance, can simply be removed from the housing and replaced or readjusted. In particular, the first inner diameter is at least as large as or larger than an outer diameter of the second bearing unit, such that the second bearing unit can be passed through the outer stator core. In comparison to this, in the case of a one-piece stator arrangement, the inside diameter of which is usually smaller than the outside diameter of the bearing unit, non-destructive removal of the stator parts after gluing, in particular after balancing, cannot be implemented. In the stator arrangement according to the invention, the inner stator core or the inner stator group can be removed in a simple but effective manner, and the bearing unit to be replaced or readjusted can then be removed through the first inner diameter of the outer stator core without having to remove the outer stator core from the housing. Overall, the electric engine according to the invention can therefore enable simpler assembly and non-destructive rebalancing of the second bearing unit. Furthermore, reworking, in particular replacing the bearing, is made possible if the balancing of the shaft assembly fails.

In designs of the electric engine, the bearing bore of the second bearing unit can be surrounded by an annular wall of the housing. The outer stator core may be located radially outside of the annular wall in the housing. In particular, the annular wall can serve as a bearing seat for the second bearing unit. Due to the split design of the stator core, the outer stator core can be inserted into the housing and fastened before the second bearing unit is installed. An annular recess surrounding the annular wall may be formed radially outward of the annular wall. The outer stator core, in particular the winding heads of the electrical windings, can be inserted into the annular recess. Expressed alternatively, the bearing seat protrudes axially into the end windings. As a result, axial space can be saved. In principle, a structural boundary between the cast outer stator core and the second bearing unit can be provided by the annular wall. This simplifies the insertion of the second bearing unit into the housing, which can be removed independently of the outer stator core. In configurations, the first inner diameter can be at least the same size as or larger than an outer diameter of the annular wall. An end face of the ring-shaped wall can be used as a bearing surface for casting mandrels when casting the outer stator core internally in the housing.

In designs of the electric engine that can be combined with any of the preceding designs, the outer stator core can be cast in the housing. In particular, the outer stator core can be cast together with the electrical windings to form an outer stator group in the housing. Considerably improved heat dissipation can be achieved by the outer stator core, which is encapsulated or cast internally or directly in the housing. This is possible because air cavities can be avoided or because casting can be carried out substantially without gaps between the housing and iron core or winding. Direct encapsulation in the housing means that adhesives can be reduced or completely avoided. Furthermore, a better connection of the winding heads can be achieved.

The present invention furthermore relates to a charging device for an internal combustion engine or a fuel cell. The charging device comprises a compressor with a compressor wheel, which is arranged rotatably in a compressor housing. Furthermore, the charging device comprises an electric engine according to any of the preceding claims, wherein the compressor wheel is non-rotationally connected to the shaft on a first shaft end.

In designs, the charging device can further comprise a turbine with a turbine wheel. The turbine wheel can be arranged rotatably in a turbine housing and can be non-rotationally connected to the shaft at a second shaft end axially opposite the first shaft end.

The present invention furthermore relates to a method for manufacturing an electric engine for a charging device or for a drive unit. Here, the housing is provided with a central housing opening. Also provided is a wound outer stator core having a first inner diameter and an inner stator core. The wound outer stator core is inserted into the housing through the central housing opening. The inner stator core is inserted into the housing through the central housing opening. A rotor is then introduced into the housing and the central housing opening is closed with a housing cover in which a first bearing unit is arranged. After the wound outer stator core inserting step and prior to the inner stator core inserting step, a second bearing assembly is passed through the central housing opening and through the wound outer stator core. The second bearing unit is placed in a bearing bore formed by an annular wall of the housing.

In designs of the method, the outer stator core can be provided by stamping an outer stator ring with stator teeth protruding radially inwards made of sheet iron. Then stacking the stamped iron sheets into an iron stack and attaching axial cover plates. In particular, the cover plates can be produced from a non-electrically conductive material.

In designs of the method that can be combined with the preceding design, the wound outer stator core can be provided by inserting slot insulations in slots of the outer stator core. Then electrical windings can be introduced into the slots. Then cover slides can be placed in the slots between adjacent pole pieces of the outer stator core.

In designs of the method that can be combined with any of the preceding designs, the wound outer stator core can be cast in an external mold before being introduced in the housing. Thereafter, the wound and externally cast outer stator core can be fixed in the housing. In particular, the wound and externally cast outer stator core can be glued into the housing. Due to the divided stator arrangement or the divided stator core (into the inner and outer stator core), in which the windings are only arranged in the outer stator core, only the outer stator core is cast. In particular, since no lubricant slots have to be kept in reserve in the outer stator core, a simply constructed casting mold, for example a cylindrical casting mold, can be used. External casting also has the advantage of reducing excess force, since the second bearing unit can be removed from the housing through the outer stator core or the outer stator group in the event of readjustment. The external form may include an inner cylinder and an outer hollow cylinder. An outer diameter of the inner cylinder can substantially correspond to the first inner diameter. An inner diameter of the outer hollow cylinder can substantially correspond to an outer diameter of the wound outer stator core.

As an alternative to external casting, the wound outer stator core can be cast internally in the housing. When it is introduced, the wound outer stator core can be placed in an annular depression in the housing, which radially outwardly surrounds the annular wall. In this placement, the wound outer stator core can then be cast in the housing. Considerably improved heat dissipation can be achieved by the outer stator core, which is cast or cast internally or directly in the housing. This is possible because air cavities can be avoided or because casting can be carried out substantially without gaps between the housing and iron core or winding. Direct encapsulation in the housing means that adhesives can be reduced or completely avoided. Furthermore, a better connection of the winding heads can be achieved. In internal casting designs, after placing the wound outer stator core and prior to casting, a cylindrical mandrel may be applied to an end face of the annular wall. An outer diameter of the cylindrical casting mandrel can substantially correspond to the first inner diameter. Alternatively or additionally, the housing for the casting with the central housing opening can be oriented substantially against the force of gravity. Alternatively or additionally, the casting can be carried out under vacuum.

In designs of the internal casting, the wound outer stator core can be cast by introducing casting material into the housing through the central housing opening. In particular, casting compound can be introduced into the housing until a predetermined filling quantity has been filled.

Alternatively, the wound outer stator core can be cast by introducing casting material into the housing through an opening separate to the central housing opening. The separate opening can be arranged on an axially opposite side of the housing with respect to the central housing opening. Alternatively, the separate opening can be arranged to the side of the central housing opening. Alternatively or additionally, the separate opening can in particular be a bore. Alternatively or additionally, the separate opening can be arranged in such a way that the housing is filled from a side that is axially removed from the central housing opening towards the central housing opening. Alternatively or additionally, the casting material can be introduced into the housing through the separate opening until a predetermined counter-pressure is reached. In particular, the casting material can be filled in through a dosing needle, wherein it is possible, for example, to measure a counter-pressure on the dosing needle. Filling under counter-pressure has advantages in terms of tolerances. In particular, fluctuating filling quantities can be better compensated for and the residual air in the housing can be better displaced. Alternatively or additionally, the material can be pressed under vacuum into a funnel opposite the separate opening in order to fill any cavities during later ventilation. In particular, casting material can rise into the funnel and be pressed back into the housing by aeration following the introduction. The funnel may be radially opposite, for example offset by substantially 1800 in the peripheral direction in relation to the separate opening. In this way, an optimal flow of the casting material around the casting mandrel can be achieved before the casting material rises into the funnel.

In designs of the method that can be combined with any of the preceding designs, resin, in particular epoxy resin, can be used as the casting material. Alternatively or additionally, the casting material can be provided with thermally conductive fillers. In particular, the casting material can be provided with electrically insulating and thermally conductive fillers. The fillers can include ceramic or mineral fillers, for example aluminum oxide.

In designs of the method that can be combined with any of the preceding designs, the inner stator core can be provided by stamping individual stator tooth extensions from iron sheets. The stamped iron sheets can then be arranged in a ring and stacked to form a laminated iron stack having an outer diameter and a second inner diameter. The laminated iron stack can be overmolded with a plastic material in order to form a retaining ring. Here, the laminated iron stack can be overmolded in such a way that lubricant channels are formed between adjacent stator tooth extensions in a radially inner region. Here, the stator tooth extensions can be arranged in such a way that lubricant channels are formed in the radial direction inwardly opening channel openings. In particular, the outer diameter of the inner stator core can substantially correspond to the first inner diameter of the outer stator ring. The plastic material can preferably be a non-electrically conductive material in order to avoid or reduce eddy currents. In designs, the plastic material of the retaining ring can include or be made from polytrimethylene terephthalate (PPT) and/or polyphenylene sulfide (PPS), for example. In addition, the material of the retaining ring can include fillers, for example a glass fiber content. Alternatively, the retaining ring can be made by casting. For example, the material of the retaining ring may include or be made of a resin material. The retaining ring allows gaps between the stator tooth extensions to be filled with the material of the retaining ring in a radially outer region and provides a secure hold for the stator tooth extensions. In addition, a tight delimitation of the lubricant channels can be achieved.

In designs of the method that can be combined with the preceding designs, the stator tooth extensions can be stamped out of the iron sheets between the outer diameter and the second inner diameter. In particular, the stator tooth extensions can be stamped from the remaining material of the sheets of the outer stator core. For example, the stator tooth extensions can be stamped at least partially from the sheet metal region between the stator teeth of the outer stator core. In addition, at least one iron sheet can be stamped out in such a way that the radially inner ends of the stator tooth extensions are connected by holding webs in the peripheral direction. This optional feature allows simplified production of the inner stator group, in particular simplified assembly or joining of the inner stator core and retaining ring.

In designs of the method that can be combined with the preceding designs, the iron sheets can be punched out in such a way that an inner pole shoe is formed on radially inner ends of the stator tooth extensions in each case. Alternatively or additionally, the iron sheets can be stamped out in such a way that an outer pole shoe is formed on radially outer ends of the stator tooth extensions in each case.

DETAILED DESCRIPTION

Figure 3:
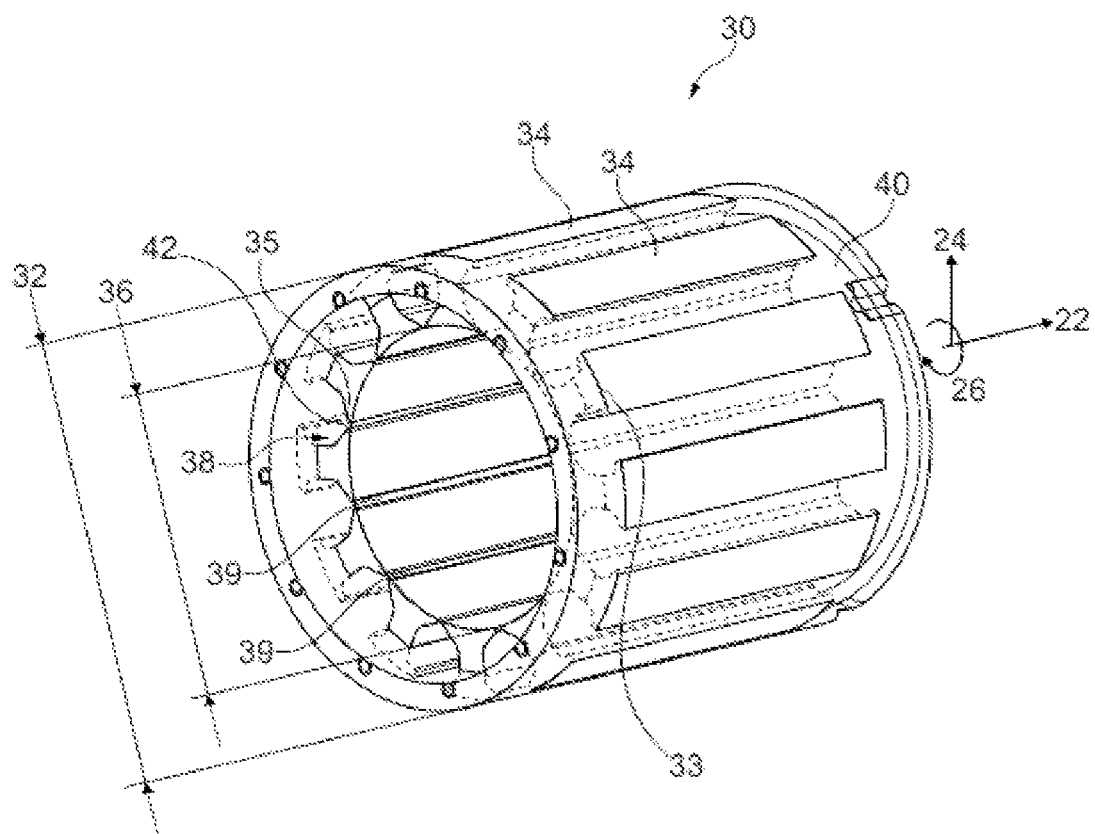
FIG. 3 shows an isometric view of the inner stator group of the stator arrangement comprising the inner stator core and the retaining ring.

In the context of this application, the expressions axial and axial direction refer to a rotational axis of the rotor 110 or to an axis of the stator arrangement 1. In relation to the figures (see e.g. FIG. 1, FIG. 3 or FIG. 4), the axial direction of the stator arrangement 1 or the rotor 110 is depicted with the reference numeral 22. A radial direction 24 here relates to the axis/axial direction 22 of the stator arrangement 1 or the rotor 110. Similarly, a periphery or a peripheral direction 26 here relates to the axis/axial direction 22 of the stator arrangement 1 or the rotor 110.

Figure 1:
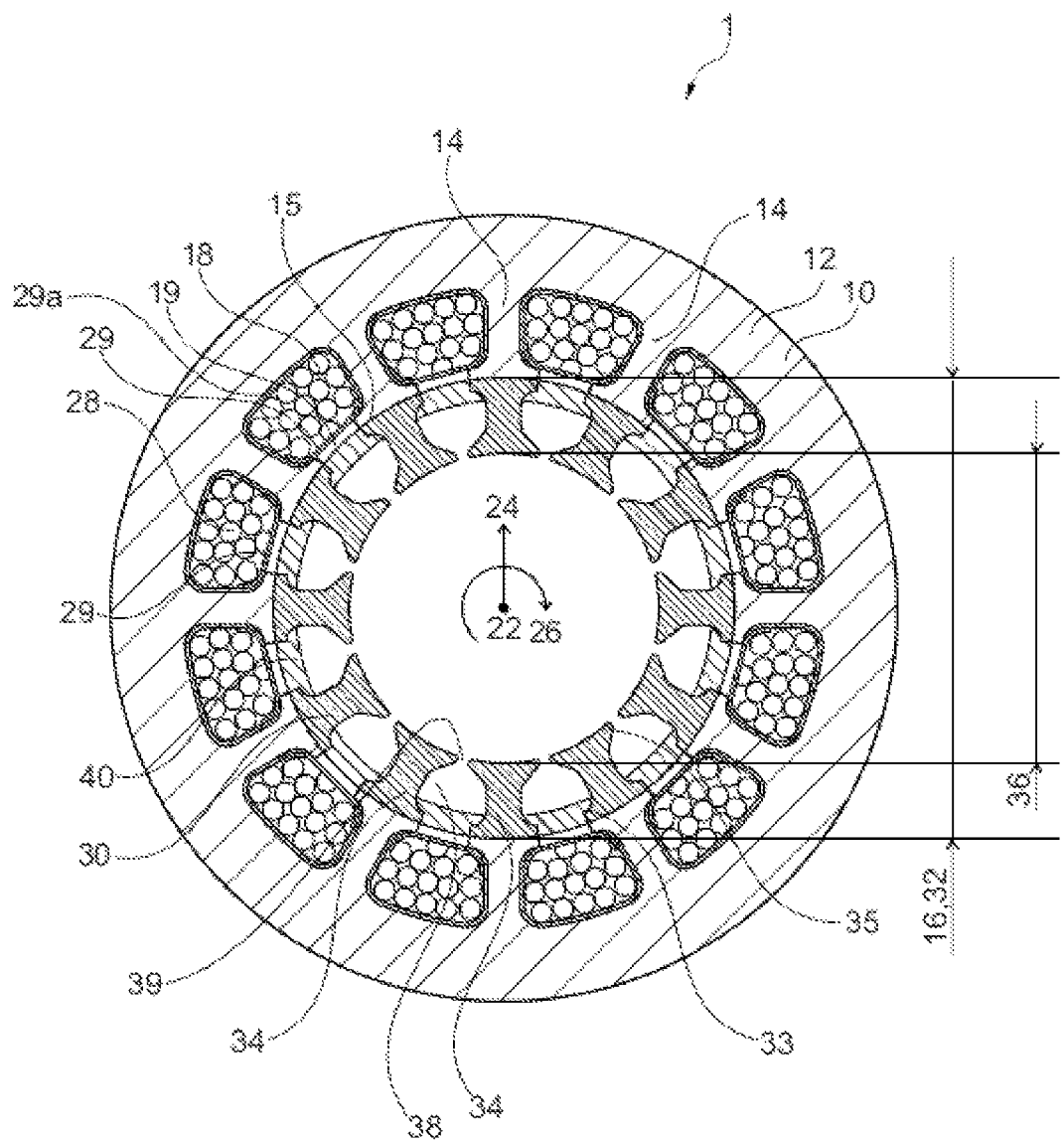
FIG. 1 shows a lateral sectional view of the stator arrangement according to the invention having an outer stator core and an inner stator core arranged concentrically therein.

An exemplary stator assembly 1 according to the present invention is in FIG. 1 in a lateral sectional view. The stator arrangement 1 is designed for an electric engine 100 with an internal rotor 110. The stator arrangement 1 is preferably designed for electric engines 100 of charging devices 200 (with regard to rotor 110, electric engine 100 and charging device 200, see FIG. 4, which is explained further below). Such electric engines or charging devices 200, such as eTurbo or E-chargers, are characterized by very high speeds of up to 60,000 to 150,000 rpm and, in particular, up to 250,000 rpm. In this case, a relatively larger gap between the fixed stator and the rotor rotating therein than in other electric motor applications, in particular slower-rotating electric engines, is common. In order to prevent imbalances due to the lubricant in this gap, the lubricant must be transported away.

Figure 2:
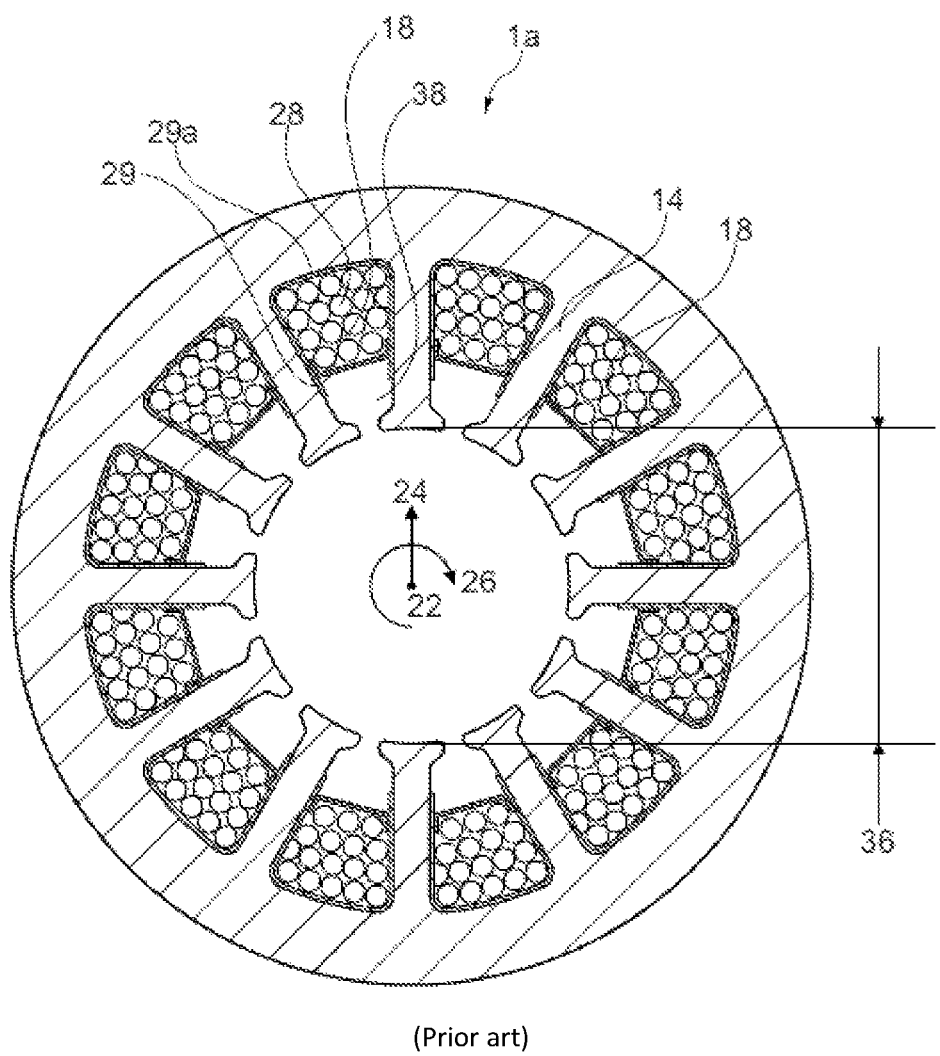
FIG. 2 shows a lateral sectional view of a known stator arrangement with lubricant channels formed radially inwards.

In this regard, FIG. 2 shows a one-piece stator arrangement 1a, in which the electrical windings 28 are only located in a radially outer region of the slots 18 between adjacent stator teeth 14. A lubricant channel 38 for discharging lubricant is located radially inside the windings 28 within a respective slot 18. Such a one-piece stator arrangement 1a requires laborious production. In particular, it is complicated to keep the windings 28 and the respective cover slide 29 in the radially outer region of a respective slot 18 during production. Furthermore, the inner diameter 36 of the stator arrangement 1a is predetermined by the size of the rotor or the electromagnetically active element located thereon. The inner diameter 36 must be designed to guide or to accommodate the rotor via a small radial gap. This results in restrictions in the assembly sequence when assembling the electric engine or when the stator arrangement is mounted in a housing of the electric engine.

In contrast to the stator arrangement 1a from FIG. 2, the stator arrangement 1 according to the invention from FIG. 1 comprises an outer stator core 10 and a separate inner stator core 30. In other words, the stator arrangement 1 can be referred to as a divided stator arrangement 1 or stator arrangement 1 with divided stator core. Here, the inner stator core 30 can be produced from the outer stator core 10 and can be installed separately, for example at a different point in time. Dividing the functions of the two stator cores 10, 30 results in various advantages. While the inner stator core 30 is designed to accommodate the rotor 110 by means of a correspondingly chosen inner diameter 36 (also referred to as second inner diameter 36), the outer stator core 10 comprises the electrical windings 28 and is responsible for generating the magnetic field. The inner stator core 30 is substantially annular in shape and extends from an outer diameter 32 to the second inner diameter 36. The inner stator core 30 is arranged inside the outer stator core 10 and, during operation, can lengthen a magnetic flux path from the outer diameter 32 to the second inner diameter 36 in the radial direction 24 inwards towards the rotor 110 which is arranged radially inside the inner stator core 30 during operation of the electric engine. The outer stator core 10 defines a first inner diameter 16 that substantially corresponds to the outer diameter 36 of the inner stator core 30. Here, the first inner diameter 16 of the outer stator core 10 is dimensioned in such a way that a bearing unit 134 of the electric engine 100 can be guided through the outer stator core 10. Expressed alternatively, the first inner diameter 16 is formed to be larger than an outer diameter 134a of a bearing unit 134 of the electric engine 100. As a result, an outer stator core 10, which is arranged fixedly in a housing 140 of the electric engine 100, can remain in the housing 140 in the event of a readjustment that may be necessary or a replacement of the bearing unit 134 that may be necessary, for example after balancing.

The stator arrangement 1 divided into the inner stator core 30 and the outer stator core 10 thus results in assembly advantages during the mounting of the stator arrangement 1 or during installation in a housing 140 of an electric engine 100 or a charging device 200. For example, a larger inner diameter (first inner diameter 16) is temporarily available in comparison to the one-piece stator arrangement 1a, in which the stator teeth 14 project further radially inwards in order to accommodate or to guide the rotor 110 or the electromagnetically active material. By specifically choosing the first inner diameter 16 to be larger than a maximum outer diameter 134a of the bearing unit 134, the excess force when the bearing is readjusted can be reduced, since, in the event of a defect such as an imbalance, for example, the bearing unit 134 can be easily removed from the (electric motor) housing 140 again through the outer stator core 10 and replaced or readjusted. In comparison to this, with the one-piece stator arrangement 1a whose inner diameter 36 is usually smaller than the outer diameter 134a of the bearing unit 134, non-destructive removal of the stator arrangement 1a fixed in the housing 140 after fixing, in particular gluing, cannot be implemented. In the stator arrangement 1 according to the invention, the inner stator core 30 or the inner stator group can be removed in a simple but effective manner, and the bearing unit 134 to be replaced or readjusted can then be removed through the first inner diameter 16 of the outer stator core 10 without having to remove the outer stator core from the housing.

A further advantage of the stator arrangement 1 according to the invention is that it enables the outer stator core 10 to be cast directly in the (engine) housing 140 without contaminating the bearing unit 134, since the bearing unit 134 can only be inserted into the housing 140 after the outer stator core 10 has been cast. Thus, with the present stator arrangement 1, a simpler and more cost-effective mounting of an electric engine 100 or installation in an electric engine housing 140 can be achieved than with a one-piece stator arrangement 1a. The possibility of direct casting in the housing 140 additionally allows the heat conduction properties or the cooling effect to be optimized, for example by avoiding or reducing air pockets between the housing 140 and the stator arrangement 1 or the wound outer stator core 10.

The division into an outer stator core 10 with the windings 28 required for the electric engine 100 and an inner stator core 30 additionally makes it possible to provide a generic outer stator core 10 or a generic outer stator group, i.e. an outer stator core 10 wound with windings 28 and cast. Such a generic outer stator core 10 or generic outer stator group can be used for different fields of applications (e.g. different speeds), since a different rotor size can be compensated for by a simple adjustment of the inner stator core 30, wherein the outer stator core 10 or stator group can maintain its dimensions. As a result, production and cost advantages as well as a reduction in production time can be achieved as a result of large quantities.

In the context of this disclosure, the outer stator core 10 can also be referred to as a radially outer stator core 30. Alternatively, the inner stator core 30 can also be referred to as the radially inner stator core 30. The fact that the outer diameter 32 of the inner stator core 30 substantially corresponds to the first inner diameter 16 can be understood in such a way that the outer diameter 32 is dimensioned to be the same as or minimally smaller than the first inner diameter 16 in order to allow the inner stator core 30 to be inserted into the outer stator core 10, wherein manufacturing tolerances are taken into consideration. "In operation" can be understood to mean both a drive mode and an idle or generator mode. "Designed to receive the rotor" can be understood to mean that the rotor 110 or the electromagnetically active element 112 can be arranged in a peripheral gap at a distance apart from the inner stator core 30 within the inner stator core 30 so that it is operational. Expressed alternatively, this can be understood in such a way that the inner stator core 30 is designed to guide the rotor 110 or the electromagnetically active element 112 with a radial gap that is larger for very fast rotating electric engines, usually relative to other electric engine applications, in particular slower rotating electric engines. The person skilled in the art understands the electromagnetically active element to be the armature with armature coils required for the rotor of an electric engine, the permanent magnet, the reluctance rotor or the squirrel-cage rotor, depending on the design of the electric engine.

As can also be seen with reference to FIG. 1, the outer stator core 10 comprises a radially outer stator ring 12 and a plurality of stator teeth 14 which, protrude radially inwardly from the stator ring 12 distributed in the peripheral direction 26. The stator teeth 14, in particular their radially inner ends, here define the first inner diameter 16. The stator teeth 14 are here stamped out of sheet metal in one piece with the stator ring 12 and are assembled as a laminated stator core. Slots 18 for receiving the electrical windings 28 are formed between adjacent stator teeth 14 in each case. Here, the grooves 14 are arranged so that they open radially inwards. The slots 18 each have a slot opening 19 formed between adjacent stator teeth 14. Here, the slot openings 19 open radially inwards. The electrical windings 28 are arranged in the slots 18. To put it more precisely, the electrical windings 28 are arranged only or exclusively on or in the outer stator core 10. Alternatively stated, the windings are not arranged in the inner stator core 30. The winding heads can protrude axially from the slots 28 on both sides (not visible in FIG. 1 see, for example, FIG. 4). With the exception of the winding heads, the electrical windings 28 are thus only or exclusively arranged in the slots 18 of the outer stator core 10. It is to be understood that the outer stator core 10 furthermore includes the slot insulation 29a, in particular slot paper, and cover insulation 29, in particular cover paper, which are customary for a stator. In this regard, a cover insulation 29, which can also be referred to as a cover slide 29, and slot insulation 29a are shown in FIG. 1 by way of example. As part of this disclosure, the outer stator ring 12 can also be referred to as a return ring 12.

As can also be seen in FIG. 1, a pole shoe 15 is formed on radially inner ends of the stator teeth 14 in each case. Pole shoes 15 can be understood to mean radially inner end regions of the stator teeth 14 which protrude laterally in the peripheral direction 26, in particular on both sides in the peripheral direction 26, from the stator teeth 14. Consequently, the slot openings 19 are formed between the pole shoes 15 of adjacent stator teeth 14. A peripheral width of the slot openings 19 can be set by correspondingly dimensioning the pole shoes 15. The stator arrangement 1 with separate stator cores 10, 30 has the advantage that the slots 18 in the outer stator core 10 can be formed with larger slot openings 19, in particular with a larger opening width in the peripheral direction 26. Due to the larger slot openings 19 or the more flexible design freedom of the slots 18 and the slot openings 19 in the outer stator core 10, a simplified winding can be achieved since the electrical windings 28 can be introduced more easily through the wide slot openings 19 than through narrow slot openings, as is usually required in conventional one-piece stator arrangements (see slot openings of the slots 18 in the stator arrangement 1a from FIG. 2). This is possible because the inner stator core 30 can provide the narrow slot openings 39 radially inside the outer stator core 10 that are favorable for reducing the pulsation losses of the magnetic field, in particular of the rotor 110. Expressed alternatively, due to the divided stator arrangement 1, the winding-relevant slots 18 or slot opening 19 of the outer stator core 10, substantially independent of losses, for example independent of pulsation losses, for holding the cover slide 29, for retaining the electrical windings 28 and/or winding can be optimized. In particular, the pole shoes 15 can improve the securing of the electrical windings 28 in the slots 18 compared to the one-piece stator arrangement 1a, which has no pole shoes between the radially outer and radially inner region of the slots 18 (compare FIG. 1 and FIG. 2). The pole shoes 15 are not only configured to fulfil a mechanical function for a possible cover slide 29. The pole shoes 15 can also be configured to provide a larger cross-sectional area, particularly when viewed in the peripheral direction, in order to minimize the magnetic impedance of a joint gap between the stator sheets.

As can be seen in FIG. 1, the inner stator core 30 comprises a plurality of stator tooth extensions 34. The stator tooth extensions 34 are arranged distributed in the peripheral direction 26 and extend from the outer diameter 32 to the second inner diameter 36. The stator tooth extensions 34 can be understood as tooth-shaped elements, which extend the stator teeth 14 inwardly in the radial direction 24. The stator tooth extensions 34 extend across the entire axial length of a respective stator tooth 14. The stator tooth extensions 34 are configured and arranged to extend a magnetic flux path from the stator teeth 14 inwardly in a radial direction 24 in operation. For this purpose, the stator tooth extensions 34 are arranged in a radial extension to the stator teeth 14. In this regard, the stator tooth extensions 34 are arranged at substantially the same positions in the peripheral direction 26 as the stator teeth 14. Furthermore, the outer diameter 32 substantially corresponds to the first inner diameter 16 of the outer stator core 10. A number of the stator tooth extensions 34 preferably corresponds to a number of the stator teeth 14. No electrical windings 28 are arranged between the stator tooth extensions 34. As already explained above in relation to the outer stator core 10, the electrical windings 28 are only in the slots 18 between the stator teeth 14 of the outer stator core 10. Lubricant channels 38 with radially inner channel openings 39 are formed between adjacent stator tooth extensions 34 in the peripheral direction 26. The channel openings 39 can also be referred to as slot openings 39 of the inner stator core 30. Due to the separate inner stator core 30 in which no electrical windings 28 are arranged, the slot opening 39 or the channel openings 39 in the inner stator core 30 can be made smaller because no electrical winding 28 has to be inserted here. This can reduce pulsation losses of the magnetic field, in particular in the rotor 110. The lubricant channels 38 run across the entire axial length of the stator tooth extensions 34. Here, the lubricant channels 38 serve as drainage in order to keep away or to divert lubricant or other fluids from the rapidly rotating rotor, in order to thus avoid damage during operation. As a result, the risk of fluids in the gap between the rotor 110 and the inner stator core 30 at high speeds leading to imbalance and/or rubbing and thus to a failure can be avoided or at least reduced. The placement of the lubricant channels 38 in the separate inner stator core 30 enables the lubricant channels 38 to be manufactured more easily in comparison to a one-piece stator arrangement 1a, in which the lubricant channels 38 would have to be kept free during casting using complex retaining tools. Furthermore, the rework and cleaning that would otherwise be necessary in order to remove flakes and other contaminants can be omitted or at least reduced.

Figure 9:
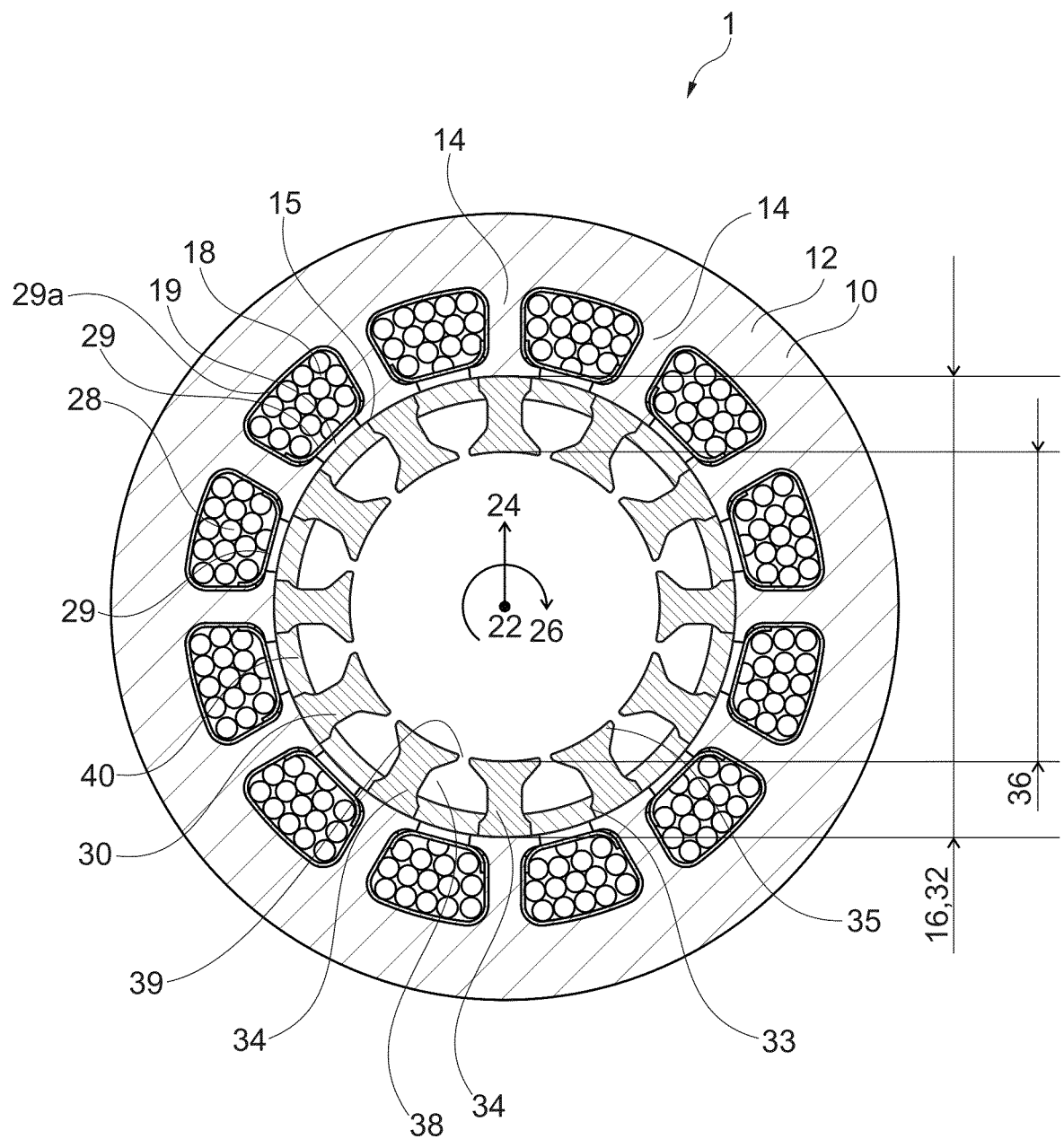
FIG. 9 shows a lateral sectional view of the stator arrangement having an outer stator core and an inner stator core arranged concentrically therein according to an alternative embodiment of the invention in which the pole shoes of the stator teeth have a greater width in the peripheral direction than the outer pole shoes of the stator tooth extensions.

As can also be seen in FIG. 1, an inner pole shoe 35 is respectively formed on radially inner ends of the stator tooth extensions 34 and an outer pole shoe 33 is respectively formed on radially outer ends of the stator tooth extensions 34. Due to separate radially inner pole shoes 35 on the separate inner stator core 30, a spacing between adjacent pole shoes 35 in the peripheral direction 26 can be chosen to be smaller than in the case of pole shoes in a one-piece stator arrangement 1a, in which electrical windings have to be guided through slots between the pole shoes. In this way, an optimization of the magnetic properties of the stator arrangement 1 or the electric engine 100 can be achieved by means of reduced pulsation losses of the magnetic field. In particular, the rotor losses and thus the rotor temperature can be reduced as a result. The inner pole shoes 35 extend laterally in the peripheral direction 26, in particular on both sides in the peripheral direction 26, to adjacent stator tooth extensions 34. The respective channel opening 39 is formed between adjacent inner pole shoes 35. The inner pole shoes 35 or the channel openings 39 are dimensioned in such a way that the lubricant can be introduced by the rotor 110 for the drainage function. The radially outer pole shoes 33 are each arranged in contact with a stator tooth 14 or with a pole shoe 15 of the stator teeth 14. In particular, a radially outer contour of the outer pole shoe 33 and a radially inner contour of the pole shoe 15 can be adapted to each other, for example by means of a concave-convex design (see FIG. 1). In doing so, the forwarding of the magnetic flux path can be improved. In some designs (see FIG. 9), the pole shoes 15 of the stator teeth 14 can have a greater width in the peripheral direction 26 than the outer pole shoes 33 of the stator tooth extensions 34. In doing so, an improvement of the magnetic flux path can also be achieved with an inner stator core 30 that is not aligned exactly rotationally in relation to the outer stator core 10. In other words, tolerance compensation can be achieved in this way.

In order to simplify the placement and positioning of the inner stator core 30 in the outer stator core 10, and in particular to simplify the placement and positioning of the stator tooth extensions 34, the stator assembly 1 may furthermore comprise a retaining ring 40 connected to the inner stator core 30 (see FIG. 1). The inner stator core 30 together with retaining ring 40 forms an inner stator group (see FIG. 3). As can be seen in particular from FIG. 3, the retaining ring 40 is arranged and configured to hold the stator tooth extensions 34 to be distributed in the peripheral direction 26 on the outer diameter 32. In particular, the retaining ring 40 may be configured in such a way that the lubricant channels 38 are formed between a radially inner region of the retaining ring 40 and respectively adjacent stator tooth extensions 34. As can also be seen from FIG. 3, the lubricant channels 34 have axial channel openings on respective axial ends in addition to the radially inner channel openings 39. Such an axial channel opening can be seen, for example, at the arrowhead of reference number 38 in FIG. 3.

Preferably, the retaining ring 40 is produced from a non-ferritic and non-electrically conductive material. For example, the retaining ring 40 can be produced from a plastic material. In some designs, the inner stator core 30 may be overmolded with a plastic material in order to form retaining ring 40. The retaining ring 40 is particularly preferably produced from a material which is designed to avoid or reduce eddy currents. For example, the material of the retaining ring 40 may comprise polytrimethylene terephthalate (PPT) and/or polyphenylene sulfide (PPS) or be produced from these. In addition, the material of the retaining ring 40 can comprise fillers, for example a glass fiber content. For example, in some designs, the retaining ring 40 may comprise a resin material or be produced from this. The retaining ring 40 allows gaps between the stator tooth extensions 34 to be filled with the material of the retaining ring 40 in a radially outer region. Furthermore, the retaining ring 40 can provide the stator tooth extensions 34 with a secure hold. In addition, the retaining ring 40 can serve as a tight delimitation, in particular as a radially outer seal, of the lubricant channels 38. Expressed alternatively, the retaining ring 40 can be designed to seal the lubricant channels 38 outwardly in the radial direction 24. In alternative designs, the stator tooth extensions 34 can also be arranged and/or fastened individually in the outer stator core 10.

The inner stator core 30 is made of a stack of iron sheets, in particular punched out of iron sheets and stacked to form a stack of iron sheets. The stator tooth extensions 34 are in particular individual elements which are arranged in the outer stator core 10 by a corresponding fastening and/or in the outer stator core 10 by corresponding aids, such as for example a retaining ring 40, according to the invention. In addition, radially inner ends of the stator tooth extensions 34 of at least one sheet of the iron sheet stack can be connected in the peripheral direction 26 by retaining webs 42 (see FIG. 3). The retaining webs 42 can ensure or simplify an orientation of the stator tooth extensions 34 between the outer diameter 32 and the second inner diameter 36. Furthermore, the retaining webs 42 can simplify the manufacture of the inner stator group, in particular a simplified assembly or joining of the inner stator core 30 with the retaining ring 40. The retaining webs 42 can also ensure an orientation of the stator tooth extensions 34 with respect to one another. In particular, orientation of the stator tooth extensions 34 by retaining webs 42 is advantageous for securing the retaining ring or overmolding the retaining ring material. In exemplary embodiments, three layers of sheet metal distributed along the axial length of the stack of sheet metal may be connected to such retaining webs 42. For example, one sheet metal layer at each axial end and one sheet metal layer centrally between retaining webs 42 may be included. In other embodiments, more or less than three sheet metal layers of the inner stator core 30 may comprise retaining webs 42. The retaining webs 42, in particular a radial thickness or cross-section of the retaining webs 42, is preferably configured such that only a negligible magnetic flux path passes through the retaining webs 42. In other words, the retaining webs 42 preferably have a magnetic impedance many times higher than the stator teeth 14 and/or stator tooth extensions 34. In particular, the retaining webs 42 or their cross-section, if present, are designed to be so thin that their paths are saturated by the magnetic field during operation and just fulfil the mechanical function. As a result, the magnetic flux is conducted through the stator teeth 14 or through the stator tooth extensions 34 and the return ring 12 during operation.

Figure 4:
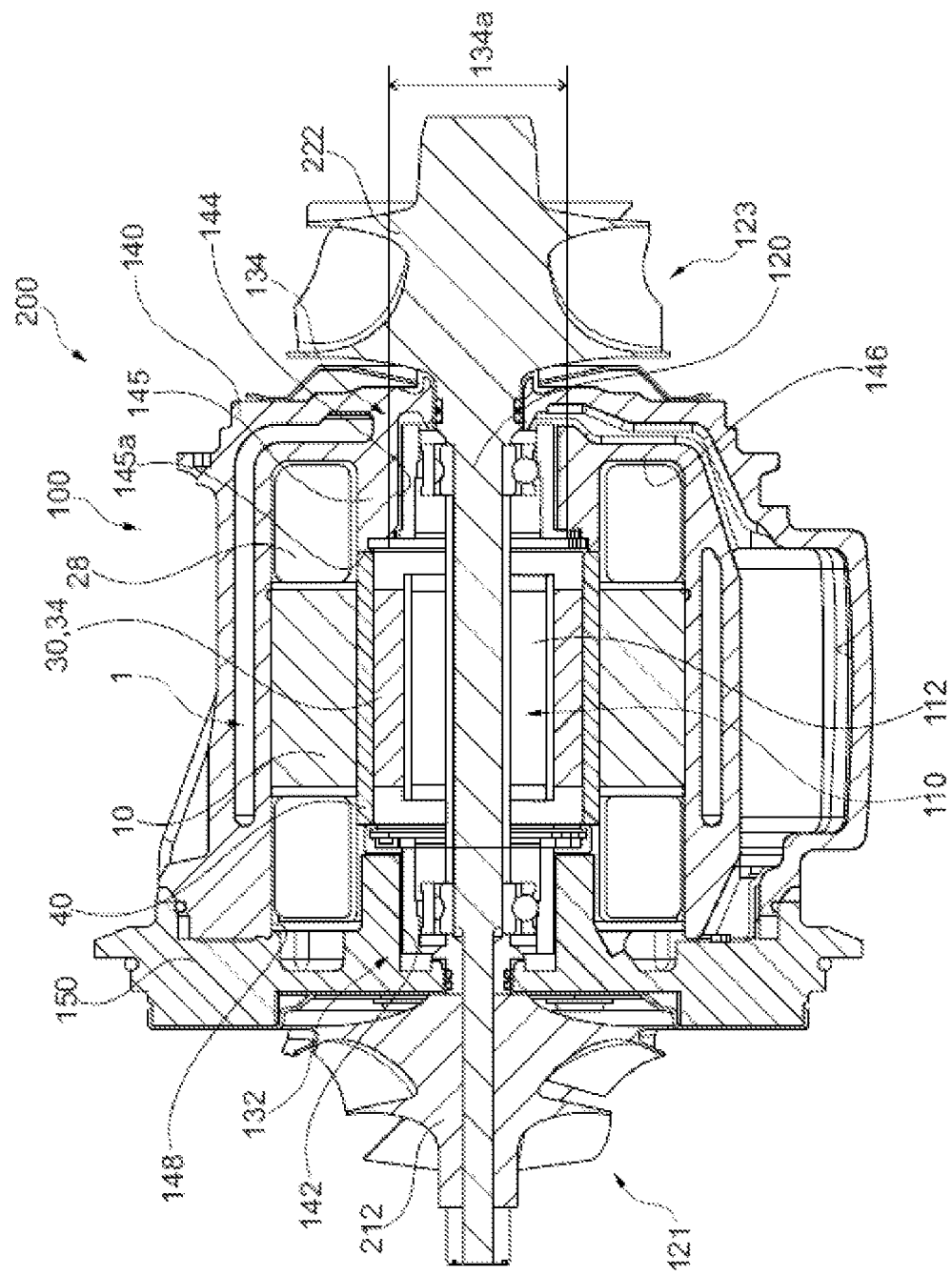
FIG. 4 shows the stator arrangement of FIG. 1 mounted in an electric engine of a charging device configured as a turbocharger by way of example in a lateral sectional view along the longitudinal axis of the shaft.

FIG. 4 shows the charging device 200 according to the invention and the electric engine 100 according to the invention, which comprise the previously explained stator arrangement 1. The charging device 200 may be configured for use in an internal combustion engine or a fuel cell, for example. FIG. 4 shows an example of a charging device 200 configured as an eTurbo. Alternatively, the charging device 200 could also be designed as an e-charger.

The charging device 200 comprises a compressor with a compressor wheel 212 which is rotatably arranged in a compressor housing. Furthermore, the charging device comprises an electric engine 100, wherein the compressor wheel 212 is non-rotatably connected to a shaft 120 of the electric engine 100 at a first shaft end 121. The charging device 200 further comprises a turbine having a turbine wheel 222. The turbine wheel 222 is rotatably arranged in a turbine housing and is non-rotatably connected to the shaft 120 at a second shaft end 123 axially opposite the first shaft end 121. For clarity, the compressor housing and the turbine housing are not shown in FIG. 4.

The electric engine 100 comprises a housing 140 with a central housing opening 148 and a housing cover 150 which closes the central housing opening 148. Furthermore, the electric engine 100 comprises a rotor 110 with a shaft 120 and an electromagnetically active element 112 mounted on the shaft 120. In the example of a charging device 200 designed as an eTurbo shown in FIG. 4, the compressor wheel 212 and the turbine wheel 222 are also arranged on the shaft 120 of the electric motor 100. The shaft 120 or the rotor 110 is mounted in the housing 140. A first bearing unit 132 supports the shaft 120 on the compressor side at a first end region between the compressor wheel 212 and the electromagnetically active element 112. A second bearing unit 134 supports the shaft 120 at a second end region opposite the first end region. In other words, the second bearing unit 134 supports the shaft 120 between the turbine wheel 222 and the electromagnetically active element 112. As shown in FIG. 4, the bearing units 132, 134 are in particular radial bearing units 132, 134.

In principle, in the context of this application, the terms "turbine housing side" or "turbine side" and "compressor housing side" or "compressor side" are to be understood as terms for axial sides, axial positions or axial directions relative to other elements, in particular to the housing 140 arranged centrally between them or the electromagnetically active element 112. However, the relative reference may also apply with respect to other elements explicitly mentioned, such that, for example, the second bearing unit 134 is arranged on the compressor side of the turbine wheel 222. In particular, "turbine housing side" or "turbine side" refers to a position further to the right of another position, for example in FIG. 4. "Compressor housing side" or "compressor side" refers to a position further to the left of another position, for example in FIG. 4. The terms "turbine housing side" and "compressor housing side" may be used as synonyms for the respective terms "turbine side" and "compressor side". In particular for applications of the electric engine 100 that do not include a compressor and/or turbine, "compressor side" can also be replaced by "opening side". Similarly, "turbine side" may also be replaced by "opening side" or "housing side". The terms "opening side" and "opening side" or "housing side" refer to the central housing opening 148 and describe, analogously to the terms "compressor side" or "turbine side", axial sides, axial positions or axial directions relative to other elements. These explanations are also applicable to the other figures in a figurative sense.

Accordingly, the first bearing unit 132 may alternatively be referred to as compressor-side bearing unit 132 or opening-side bearing unit 132. Alternatively, the second bearing unit 134 may also be referred to as turbine-side bearing unit 134 or opening-side bearing unit 134. Alternatively, the first bearing unit 132 supports the shaft 120 on the opening side adjacent to the electromagnetically active element 112. The second bearing unit 134 supports the shaft 120 on the opening side adjacent to the electromagnetically active element 112.

An outer diameter 134a of the second bearing unit 134 is larger than the second inner diameter 36 of the inner stator core 30. The outer diameter 134a of the second bearing unit 134 is also larger than an outer diameter of the rotor 110 or the electromagnetically active element 112. Alternatively, the outer diameter of the rotor 110 or the electromagnetically active element 112 is smaller than the outer diameter 134a of the second bearing unit 134. The second inner diameter 36 of the inner stator core 30 is smaller than the outer diameter 134a of the second bearing unit 134. In particular, the first inner diameter 16 of the outer stator core 10 is formed to be larger than the outer diameter 134a of the second bearing unit 134. This allows the second bearing unit 134 to be mounted in the housing 140 through the outer stator core 10. The first bearing unit 132 is preferably dimensioned analogously to the second bearing unit 134. In alternative embodiments, the first bearing unit 132 may also be larger or smaller in size than the second bearing unit 134.

The housing cover 150 comprises a mounting bore 142 in which the first bearing unit 132 is arranged. The first bearing bore 142 is formed as a recess. A mounting bore 144 is formed in the housing 140 on the side away from the opening, in which the second bearing unit 134 is arranged. The second bearing bore 144 is formed as a recess. The bearing bore 142 of the housing cover 150 can also be referred to as the first bearing bore 142. The bearing bore 144 of the housing 140 may also be referred to as the second bearing bore 144. The bearing bore 144 of the second bearing unit 134 is surrounded by an annular wall 145 of the housing 140. The outer stator core 10 is arranged radially outside the annular wall 145 in the housing 140. The annular wall 145 serves in particular as a bearing seat for the second bearing unit 134. Due to the split design of the stator arrangement 1, the outer stator core 10 can be inserted and fixed in the housing 140 before the second bearing unit 134 is mounted. Radially outside the annular wall 145, an annular recess 146 is formed surrounding the annular wall 145. The outer stator core 10, in particular the winding heads of the electrical windings 28 are inserted into the annular recess 146. Alternatively expressed, the bearing seat or annular wall 145 projects axially into the winding heads. This can save axial installation space. In principle, the annular wall 145 can provide a structural boundary between the outer stator core 10 and the second bearing unit 134. This simplifies the insertion of the second bearing unit 134 into the housing 140, which can be removed independently of the outer stator core 10. The first inner diameter 16 is at least equal to or larger than an outer diameter of the annular wall 145. An end face 145a of the annular wall 145 can be used as a support surface for a casting mandrel 160 during an internal casting of the outer stator core 10 in the housing 140.

By dimensioning the first inner diameter 16 of the outer stator core 10 in such a way that the second bearing unit 134 can be passed through it, the excess force can be reduced when readjusting the bearing units 132, 134, since the second bearing unit 134, in case of a defect such as an imbalance, can be easily removed from the housing 140 again through the outer stator core 10 and replaced or readjusted. In particular, the first inner diameter 16 is at least equal to or larger than an outer diameter of the second bearing unit 134, such that the second bearing unit 134 can be passed through the outer stator core 10. In comparison, in the case of a one-piece stator arrangement 1a, the inner diameter 36 of which is smaller than the outer diameter of the bearing unit, non-destructive removal of the stator parts after bonding, in particular after balancing, cannot be implemented. In the stator arrangement according to the invention, in a simple but effective manner, the inner stator core 10 or the inner stator assembly can be removed and then the bearing unit 134 to be replaced or readjusted can be removed through the first inner diameter 16 of the outer stator core 10 without having to remove the outer stator core 10 from the housing 140. Thus, the electric engine 100 according to the invention can overall enable a simpler assembly and a non-destructive rebalancing of the second bearing unit 134. Furthermore, reworking, in particular replacement of the bearing or bearing unit 134, is made possible if the balancing of the shaft assembly fails.

The outer stator core 10 may be internally cast within the housing 140 or externally cast and secured within the housing 140. Preferably, the outer stator core 10 is cast together with the electrical windings 28 to form an outer stator assembly in the housing 140. By having the outer stator core 10 cast or encapsulated internally or directly within the housing 140, significantly improved heat dissipation can be achieved. This is possible because air cavities can be avoided and because there are essentially no gaps between the housing 140 and the iron core or winding 28. By casting directly in the housing 140, adhesives can be reduced or completely avoided. Furthermore, a better connection of the winding heads can be achieved. Furthermore, contamination of the bearing units 132, 134 can be avoided by internal encapsulation, as these can only be inserted into the housing 140 after encapsulation.

In particular, the outer stator core 10 may be vacuum cast together with the electrical windings 28 to form an outer stator group. The outer stator group may comprise a casting material, for example epoxy resin, that is provided with heat conduction enhancing fillers. The split stator group 1 according to the invention allows the casting of the entire outer stator core 10 with the windings 28 without any complex restraining devices for the electrical windings 28, which are required, for example, in a conventional one-piece stator assembly 1a, to keep the electrical windings 28 in the radially outer region of the slots 18, so that lubricant channels 38 required for the removal of lubricant remain formed in the radially inner region of the slots 18. In particular, no additional material is required to be inserted into the slots 18 to support the cover slides 29. In addition, the cover slides 29 can be made thinner than in conventional systems because the winding-relevant slot opening 19, i.e. the slot opening 19 of the slots 18 in the outer stator core 10, can be optimized for cover slide retention and winding substantially independently of losses, for example pulsation losses. This is enabled by the separate inner stator core 30, which in turn can be optimized for reducing any losses, in particular pulsation losses (independent of winding or deck slide restrictions). Overall, faster and less expensive casting can be achieved with simpler casting tools, especially in an eTurbo arrangement.

In deigns, the electric engine 100 is in particular a permanent magnet excited synchronous motor. In alternative designs, the electric engine 100 can also be used for squirrel-cage rotors or reluctance rotors.

Although the electric engine 100 has been described herein only with reference to the charging device 200, the electric engine 100 could also be used for other applications such as a drive device, in particular a drive device for a motor vehicle. For example, the electric engine 100 could be used as a drive device in a drive train of a motor vehicle. One such application could be used as a traction motor with a housing open on one side, in which a bearing unit on the side away from the opening has a larger outer diameter than the innermost diameter of the stator arrangement.

With reference to FIGS. 5 to 8, the method of manufacturing the electric engine 100 for the charging device 200 or for a drive unit according to the invention is explained below.

Here, the housing 140 is provided with a central housing opening 148 and a housing cover 150. Further provided is a wound outer stator core 10 having a first inner diameter 16 and an inner stator core 30.

Figure 5:
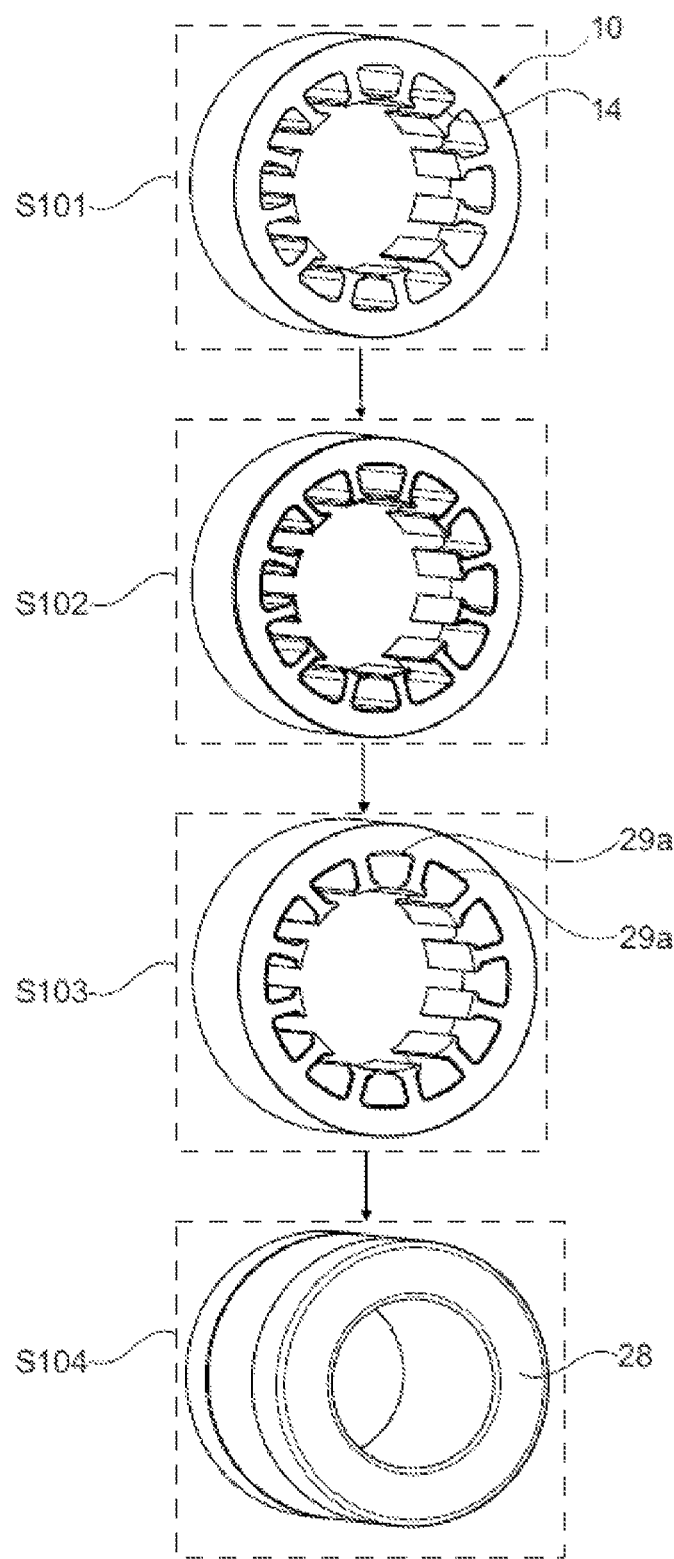
FIG. 5 shows partial steps of the production of the wound outer stator core of the method according to the invention for producing an electric engine.
Figure 6:
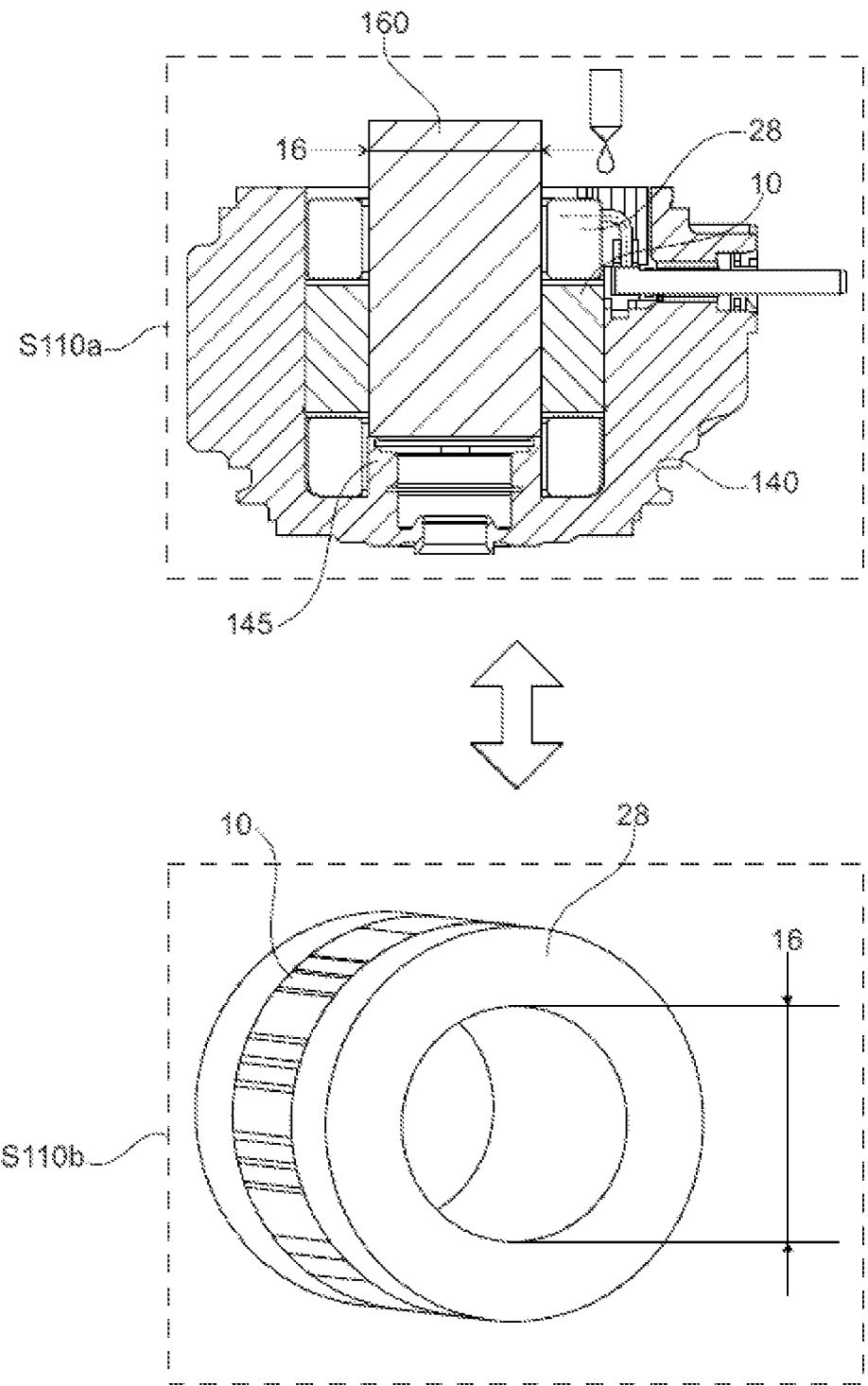
FIG. 6 schematically depicts two alternative method steps of the internal casting of the wound outer stator core to form an outer stator group in the housing or an externally cast outer stator group.

The provision of the wound outer stator core 10 is explained with reference to FIG. 5. The outer stator core 10 is provided by punching an outer stator ring 12 with radially inwardly projecting stator teeth 14 from sheet iron, such that grooves 18 are formed peripherally between adjacent stator teeth 14. The stator teeth 14 are punched out in such a way that their radially inner ends form the first inner diameter 16. The stator teeth 14 can be punched in such a way that pole shoes 15 are formed at their radially inner ends. As shown in S101, the punched iron sheets are stacked to form an iron sheet stack. Then, in S102, axial cover plates are attached. The cover plates are made of a non-electrically conductive material. Alternatively, the cover plates may be referred to as insulation plates. Then, in S103, slot insulators 29a are placed in the slots 18 of the outer stator core 10. The wound outer stator core 10 is provided in S104 by inserting electrical windings 28 into the slots 18, forming the winding heads and interconnecting them. In this process, after inserting the electrical windings 28, cover slides 29 are inserted into the slots 18 between adjacent pole pieces 15 of the outer stator core 10.

Next, the wound outer stator core 10 is inserted into the housing 140 through the central housing opening 148. Two alternative steps can be distinguished according to FIG. 6. According to S110a, the wound outer stator core 10 may be inserted into the housing 140 and cast internally in the housing 140. Alternatively, according to S110b, the wound outer stator core 10 can be cast externally and then fixed in the housing 140.

According to S110b, the wound outer stator core 10 is cast in an external mold prior to insertion into the housing 140. Thereafter, the wound and externally cast outer stator core 10 is inserted into an annular recess 146 of the housing 140 and secured within the housing 140. In particular, the wound and externally cast outer stator core 10 may be bonded into the housing 140. By having the split stator assembly 1 with the electrical windings 28 arranged only in the outer stator core 10, only the outer stator core 10 is cast. In particular, since no lubricant grooves need to be provided in the outer stator core 10, a simply constructed casting mold, for example a cylindrical one, can be used (not shown). Also with external casting, there are the advantages of reducing a balancing cast, as the second bearing unit 134 can be removed from the housing 140 through the outer stator core 10 or outer stator group in the event of readjustment. The external mold may comprise an inner cylinder and an outer hollow cylinder. An outer diameter of the inner cylinder may substantially correspond to the first inner diameter 16. An inner diameter of the outer hollow cylinder may substantially correspond to an outer diameter of the wound outer stator core 10.

As an alternative to external casting, the wound outer stator core 10 can be cast internally in the housing 140. In this case, the wound outer stator core 10 is inserted into the housing 140 or placed in the annular recess 146 of the housing 140. In this placement, the wound outer stator core 10 can then be cast in the housing 140 according to S110a. By having the outer stator core 10 cast or molded internally or directly into the housing 140, significantly improved heat dissipation can be achieved. This is possible because air cavities can be avoided and because there are substantially no gaps between the housing 140 and the iron core or windings 28. By casting directly in the housing 140, adhesives can be reduced or completely avoided. Furthermore, a better connection of the winding heads can be achieved. In internal casting, after placing the wound outer stator core 10 and before filling with casting compound, a cylindrical casting mandrel 160 is placed against an end face 145a of annular wall 145. In this regard, an outer diameter of the cylindrical potting mandrel 160 is substantially equal to the first inner diameter 16. In this regard, the housing 140 will be oriented substantially against gravity for casting with the central housing opening 148. Alternatively, the housing 140 will be oriented with central housing opening 148 facing upward.

According to FIGS. 7a to 7d, the wound outer stator core 10 may be cast by introducing casting material into the housing 140 through the central housing opening 148 or by introducing casting material through a separate opening 149.

According to FIG. 7a, the casting material can be introduced into the housing 140 via the central housing opening 148 until a predetermined filling amount is poured in.

According to FIG. 7b, the opening 149 separate from the central housing opening 148 can be arranged on an axially opposite side of the housing 140 with respect to the central housing opening 148. In alternative embodiments, the separate opening 149 may be arranged to the side of the central housing opening 148 or to the side of the housing 140. The separate opening 149 is arranged in such a way that the housing 140 is filled from a side axially remote from the central housing opening 148 towards the central housing opening 148. In doing so, the casting material is introduced into the housing 140 through the separate opening 149 until a predetermined counter-pressure is reached. In particular, the casting material can be filled through a dispensing needle, wherein a counter-pressure can be measured at the dispensing needle, for example. Filling with counter-pressure has advantages with regard to tolerances. In particular, fluctuating filling quantities can be better compensated for and the residual air in the housing 140 can be better displaced.

FIG. 7c shows a further variant of internal casting. Here, an opening 149 separate from the central housing opening 148 is provided through which the housing 140 can be filled from a side axially remote from the central housing opening 148 towards the central housing opening 148. Compared to the embodiment according to FIG. 7b, in the embodiment according to FIG. 7c, the filling material can be filled from above through a first conduit 149a and then introduced into the interior of the housing 140 through a second conduit 149b in a lower region of the housing 140. In other words, in the example of FIG. 7c, the separate opening 149 is formed by the two conduits 149a, 149b. Alternatively, the separate opening may be referred to as the filler conduit 149. A blocking plug may be located in an outer portion of conduit 149b, during casting, to prevent leakage. In particular, the conduits 149a, 149b may be introduced into the housing 140 through holes. In alternative embodiments, the filling can be controlled by counter-pressure, analogously as described above. Compared to the embodiment of FIG. 7b, this embodiment results in a procedural simplification, since a filling device, for example a dosing needle, can be brought up to the housing from above in an easily accessible manner.

In designs, the casting, in particular the internal casting, may be performed under vacuum in the housing 140. In particular, the casting may be performed under fine vacuum, high vacuum or ultra-high vacuum. For example, the casting can be performed at a pressure of from 1 hPa to $1\times10^{-11}$ hPa, in particular $1\times10^{-2}$ hPa to $1\times10(-8)$ hPa or in particular $1\times10^{-3}$ hPa to $1\times10(-6)$ hPa. This is particularly advantageous for internal casting through the separate opening 149.

Figure 7:
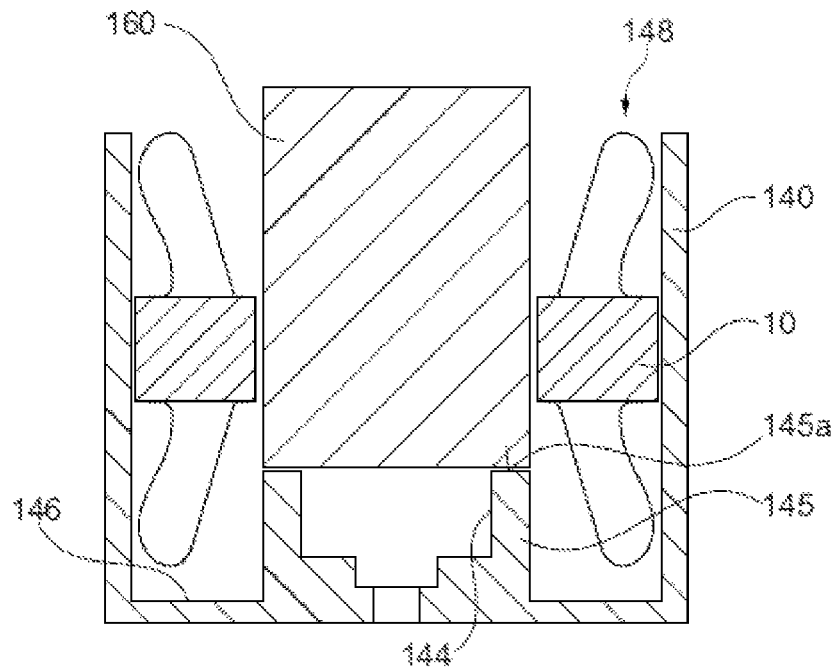
FIG. 7A and FIG. 7B show two variants of the internal casting of thee wound outer stator core with an amount-controlled or a counter-pressure-controlled casting.
FIG. 7C shows a third variant of the internal casting of the wound outer stator core.
FIG. 7D shows an exemplary variant of the internal casting of the wound outer stator core in a vacuum.
Figure 7:
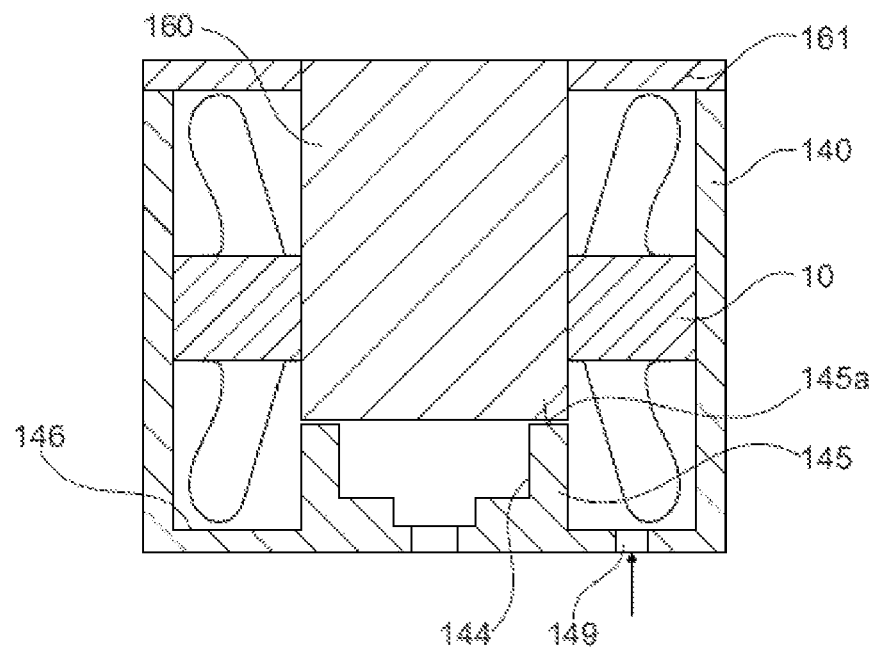
Figure 7:
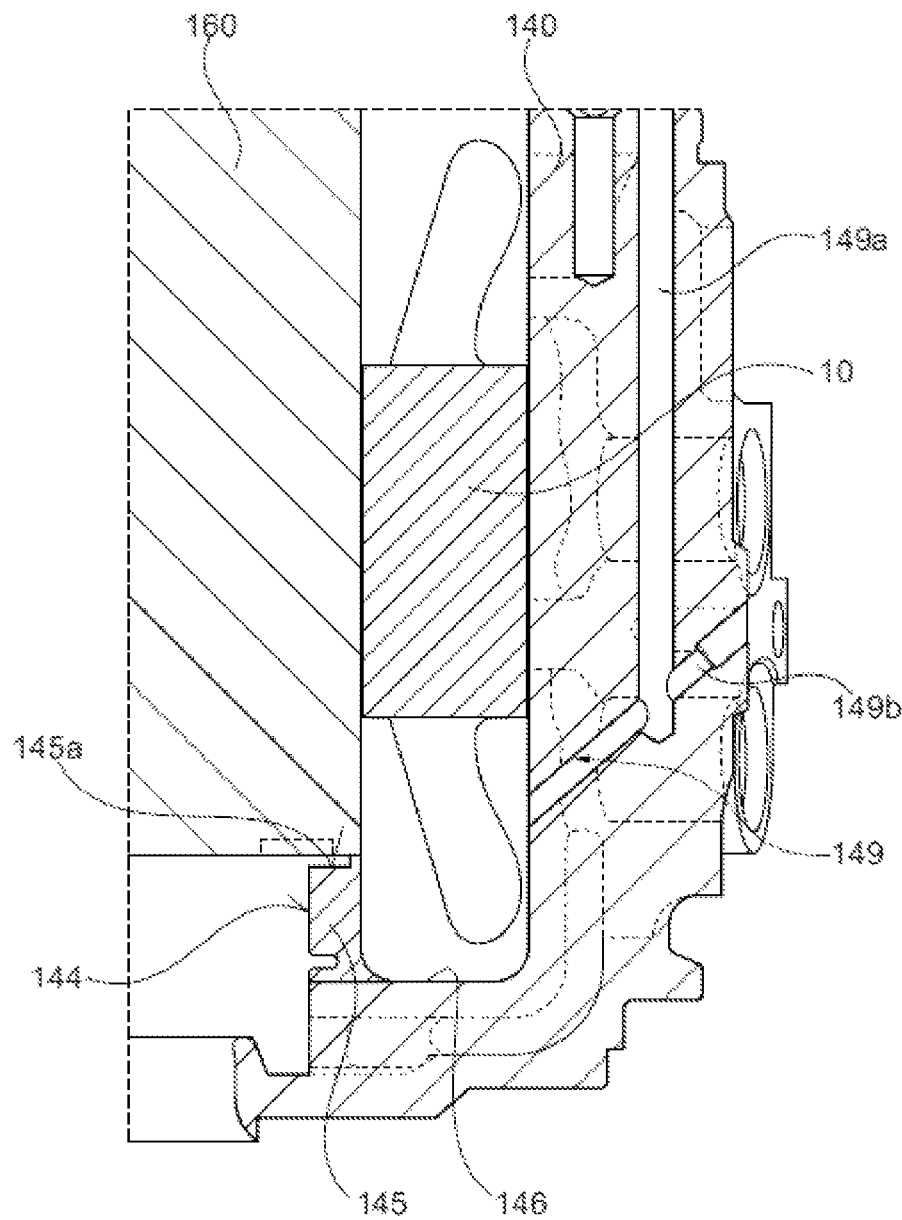
Figure 7D:
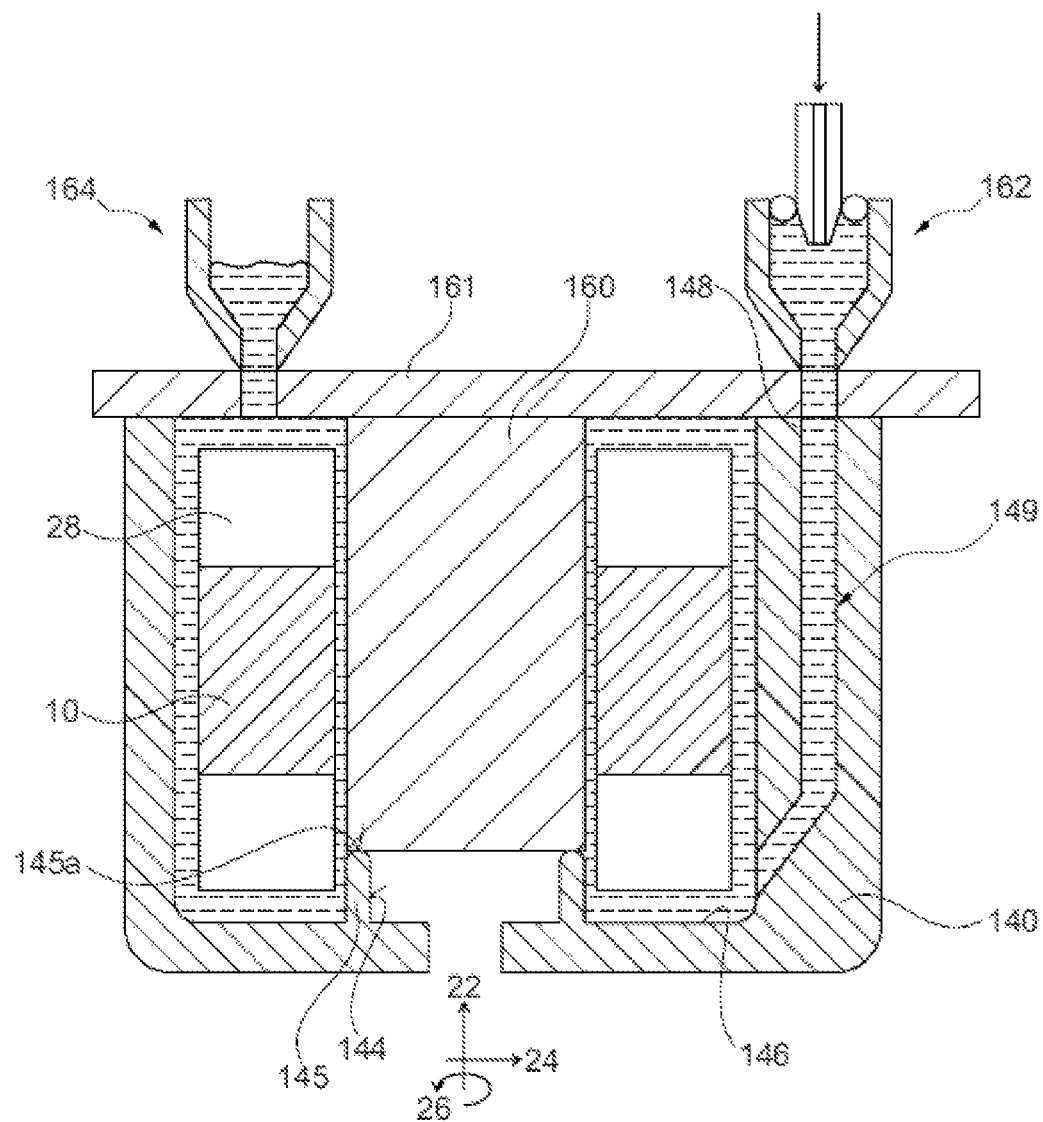

FIG. 7d shows an exemplary variant of internal casting under vacuum. In this case, an opening 149 separate from the central housing opening 148 is provided through which the housing 140 can be filled from a side axially remote from the central housing opening 148 towards the central housing opening 148. The separate opening 149 can be arranged adjacently to the central housing opening 148 in the housing 140. This provides easy accessibility. The separate opening 149 can lead via a channel to a lower region of the housing 140, in particular into a region of the annular recess 146. This allows the housing to be filled from the bottom upwards, i.e. against the force of gravity. At the same time, easy accessibility can be maintained through the separate opening 149 located on the upper side of the housing 140 with the channel or riser pipe running downwards. The separate opening 149 may, for example, be formed by two conduits as described with reference to FIG. 7c, or as shown in FIG. 7d, by a single one with an appropriate slope or curvature. The central housing opening 148 may be closed, in particular sealed in an airtight manner, by a casting cover 161 which is integral with the casting mandrel 160 or separate therefrom. A vacuum can be created inside the housing 140 via suitable devices known to the person skilled in the art. The casting material can be filled into the housing 140 via a first funnel 162. Excess casting material can rise into a second funnel 164. In particular, the second funnel 164 is arranged on the casting lid 161. In particular, the second funnel 164 is arranged on a side of the housing 140 opposite the first funnel 162 with respect to the axis 22. This allows the casting compound to be passed through the housing 140, in particular around the casting mandrel 160, before it can rise in the second funnel 164. Once a predetermined counter-pressure or fill level is reached, the housing is ventilated. In other words, the vacuum is removed and at least some of the excess material from the second funnel 164 is forced back into the housing 140. This is particularly advantageous in allowing any cavities to be filled more effectively. This is possible due to the ambient pressure that is applied to the second funnel 164 when the vacuum is removed. Alternatively or additionally, an overpressure can be applied after filling to further increase the degree of filling. As shown in FIG. 7d, the first funnel 162 may be filled via a dispensing needle. The dispensing needle may be sealed to the first funnel 162 via an O-ring. Alternatively to the funnels 162, 164, other suitable vessels may be used. Alternatively, the dispensing needle may be connected directly to the separate opening 149. The separate opening may also be referred to as a feed channel or riser.

Resin, in particular epoxy resin, is preferably used as the casting material. In particular, the casting material can be provided with thermally conductive fillers. In particular, the casting material may be provided with electrically insulating and thermally conductive fillers. The fillers may comprise ceramic or mineral fillers, for example aluminum oxide.

After the outer stator core 10 has been cast and inserted into the housing, the second bearing unit 134 is passed through the central housing opening 148 and through the wound outer stator core 10. The second bearing unit 134 is arranged in a bearing bore 144 formed by an annular wall 145 of the housing 140 (see S123 in FIG. 8). In this case, the outer stator core 10 is arranged in the annular recess 146 which surrounds the annular wall 145 radially outwards.

After insertion of the second bearing unit 134, the inner stator core 30 is inserted into the housing 140 through the central housing opening 148. The inner stator core 30 is arranged within the outer stator core 10 such that stator tooth extensions of the inner stator core 10 are arranged in radial extension to the stator teeth 14 of the outer stator core 10 (see S124 in FIG. 8).

Figure 8:
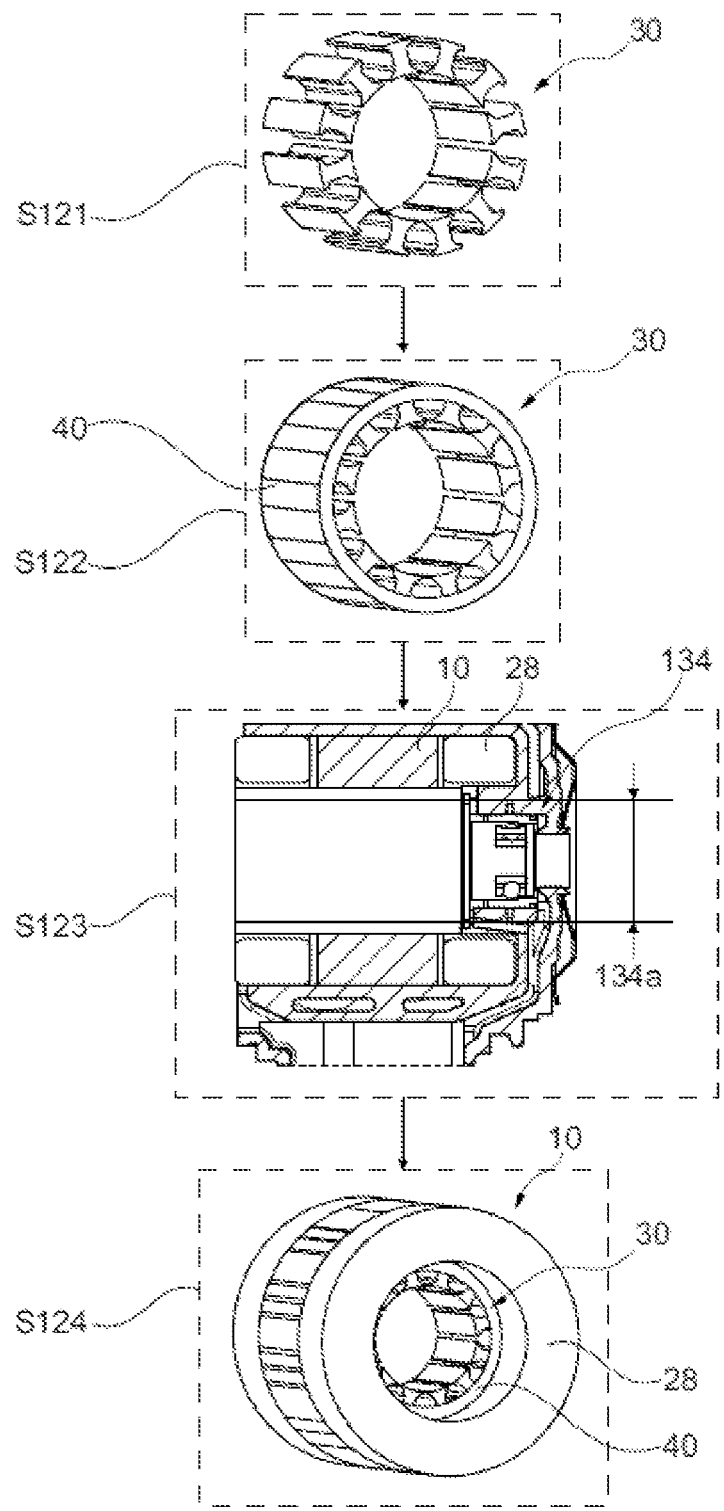
FIG. 8 schematically shows the method steps for producing the inner stator group, mounting the second bearing unit and subsequently introducing the inner stator group before further components of the charging device are mounted, as can be seen in FIG. 4.

The provision of the inner stator core 30 according to S121 and S122 of FIG. 8 can take place independently of the provision of the outer stator core 10. The inner stator core 30 can also be provided before or after the insertion of the second bearing unit 134. The inner stator core 30 is provided by punching individual stator tooth extensions 34 from iron sheets. Thereafter, the stamped iron sheets are arranged in a ring to form an outer diameter 32 and a second inner diameter 36, and then stacked to form an iron sheet stack (see S121 in FIG. 8). Alternatively expressed, the stator tooth extensions 34 are punched out such that they have a length equal to the difference between the desired outer diameter 32 and the desired second inner diameter 36.

Preferably, the iron sheet stack is overmolded with a plastic material to form a retaining ring 40 (see S122 in FIG. 8). The stack of iron sheets can be overmolded in such a way that lubricant channels 38 are formed between adjacent stator tooth extensions 34 in a radially inner area. The stator tooth extensions 34 can be arranged in such a way that the lubricant channels 38 comprise channel openings 39 opening inwards in the radial direction 24. In particular, the outer diameter 32 of the inner stator core 30 is substantially equal to the first inner diameter 16 of the outer stator ring 30. Preferably, the plastic material may be a non-ferritic and/or non-electrically conductive material to avoid or reduce eddy currents. In designs, the plastic material of the retaining ring 40 may comprise or be made from, for example, polytrimethylene terephthalate (PPT) and/or polyphenylene sulfide (PPS). Additionally, the material of the retaining ring 40 may comprise fillers, for example a glass fiber content. Alternatively, the retaining ring 40 may be manufactured by casting. For example, the material of the retaining ring may comprise or be made from a resin material. In some embodiments, the retaining ring 40 may be a pre-manufactured part having recesses into which the stator tooth extensions 34 are inserted. The retaining ring 40 may allow gaps between the stator tooth extensions 34 in a radially outer region to be filled with the material of the retaining ring 40. Furthermore, the retaining ring 40 can provide a secure fit for the stator tooth extensions 34. In addition, the retaining ring 40 may serve as a tight boundary, particularly as a radially outer seal, of the lubricant channels 38. Alternatively, the retaining ring 40 may be configured to seal the lubricant channels 38 outwardly in the radial direction 24. In alternative embodiments, the stator tooth extensions 34 may also be arranged and/or fixed individually in the outer stator core 10.

In embodiments of the method, the outer stator core 10 and the inner stator core 30 may be stamped from the same sheets. For example, the stator tooth extensions 34 may be stamped from the iron sheets between the outer diameter 32 and the second inner diameter 36. In particular, the stator tooth extensions 34 may be stamped from the remaining material of the sheets of the outer stator core 10. For example, the stator tooth extensions 34 may be at least partially stamped from the sheet metal area between the stator teeth 14 of the outer stator core 10.

When punching out the stator tooth extensions 34, at least one iron sheet can be punched out in such a way that radially inner ends of the stator tooth extensions 34 are connected in the peripheral direction 26 by retaining webs 42. Through this optional feature, a simplified production of the inner stator assembly, in particular a simplified assembly or joining of the inner stator core 30 and the retaining ring 40 can be achieved. When punching out the stator tooth extensions 34, the iron sheets can be punched out in such a way that an inner pole shoe 35 is formed at radially inner ends of each of the stator tooth extensions 34 and an outer pole shoe 33 is formed at radially outer ends of each of the stator tooth extensions 34 (see S121 in FIG. 8).

After inserting the inner stator core 10 of S124, the rotor 110 with the electromagnetically active material 112 is inserted into the housing 140, and the central housing opening 148 is closed with a housing cover 150 in which a first bearing unit 132 is arranged (see FIG. 4).

Although the present invention has been described above and is defined in the appended claims, it should be understood that the invention can also be defined alternatively corresponding to the following embodiments:

1. Stator arrangement (1) for an electric engine (100) having an inner rotor (110) comprising:
    an outer stator core (10) with electrical windings (28), and
    a separate inner stator core (30), which is arranged inside the outer stator core (10) and is designed to receive the rotor (110),
    characterized in that
    the outer stator core (10) defines a first inner diameter (16), which is dimensioned in such a way that a bearing unit (134) of the electric engine (100) can be guided through the outer stator core (10), and
    an outer diameter (32) of the inner stator core (30) substantially corresponds to the first inner diameter (16), wherein the inner stator core (30) is designed to extend a magnetic flux in the radial direction (24) during operation.

2. Stator arrangement (1) according to embodiment 1, wherein the outer stator core (10) comprises a radially outer stator ring (12) and a plurality of stator teeth (14), which protrude radially inwards from the stator ring (12) distributed in the peripheral direction (26) and define the first inner diameter (16).

3. Stator arrangement (1) according to embodiment 2, wherein the outer stator core (10) furthermore comprises a plurality of slots (18), which are respectively formed between adjacent stator teeth (14), and wherein the electrical windings (28) are arranged in the slots (18).

4. Stator arrangement (1) according to embodiment 3, wherein the outer stator core (10) is cast together with the electrical windings (28) to form an outer stator group.

5. Stator arrangement (1) according to one of the preceding embodiments, wherein the inner stator core (30) comprises a plurality of stator tooth extensions (34), which are arranged distributed in the peripheral direction (26) and extend from the outer diameter (32) to a second inner diameter (36).

6. Stator arrangement (1) according to embodiment 5, wherein lubricant channels (38) with radially inner channel openings (39) are formed between adjacent stator teeth extensions (34) in the peripheral direction (26).

7. Stator arrangement (1) according to one of embodiments 5 or 6, furthermore comprising a retaining ring (40) which is connected to the inner stator core (30) and is arranged and configured to hold the stator teeth extensions (34) on the outer diameter (32) distributed in the peripheral direction (26).

8. Stator arrangement (1) according to embodiment 7, wherein the retaining ring (40) is produced from non-ferritic material, in particular from a plastic material, and optionally wherein the inner stator core (30) is overmolded with a plastic material in order to form the retaining ring (40).

9. Stator arrangement (1) according to one of embodiments 7 or 8, wherein the inner stator core (30) is produced from a sheet packet, and wherein radially inner ends of the stator teeth extensions (34) of at least one sheet of the sheet packet are connected by holding webs (42) in the peripheral direction (26) in order to ensure an orientation of the stator teeth extensions (34) between the outer diameter (32) and the second inner diameter (36).

10. Stator arrangement (1) according to one of the preceding embodiments, when at least depending one embodiment 3, wherein a pole shoe (15) is formed in the slots (18) for holding back the electrical windings (28) on radially inner ends of the stator teeth (14) in each case.

11. Stator arrangement (1) according to one of the preceding embodiments, when at least depending one embodiment 5, wherein one pole shoe (35) in each case is formed on radially inner ends of the stator teeth extensions (34) and/or one outer pole shoe (33) in each case is formed on radially outer ends of the stator teeth extensions (34).

12. Stator arrangement (1) according to embodiment 10 and 11, wherein the pole shoes (15) of the stator teeth (14) have a greater width in the peripheral direction (26) than the outer pole shoes (33) of the stator teeth extensions (34).

13. Stator arrangement (1) according to one of the preceding embodiments, wherein the outer stator core (10) and/or the inner stator core (30) are made up of laminated layers made of a ferritic material, in particular an iron material.

14. Electric engine (100) for a charging device (200) or for a drive unit, comprising:
    a housing (140),
    a housing cover (150),
    a rotor (110) having a shaft (120) and an electromagnetically active element (112) fixed on the shaft (120),
    a first bearing unit (132), which is received in a bearing bore (142) of the housing cover (150) on a side of the rotor (110), and a second bearing unit (134), which is received in a bearing bore (144) of the housing (140) on an opposite side of the rotor (110),
    characterized by a stator arrangement (1) according to one of the preceding embodiments.

15. Electric engine (100) according to embodiment 14, wherein the bearing bore (144) of the second bearing unit (132) is surrounded by an annular wall (145) of the housing (140), and wherein the outer stator core (10) is in the housing (140) arranged radially outside the annular wall (145).

16. Electric engine (100) according to embodiment 15, wherein the first inner diameter (16) is at least the same as or greater than an outer diameter of the annular all (145).

17. Electric engine (100) according to one of embodiments 14 to 16, wherein the outer stator core (10) is cast in the housing (140).

18. Charging device (200) for an internal combustion engine or a fuel cell comprising a compressor having a compressor wheel (212), which is arranged rotatably in a compressor housing,
    characterized by an electric engine according to one of embodiments 14 to 17, wherein the compressor wheel (212) is non-rotationally connected to the shaft (120) on a first shaft end (121).

19. Charging device (200) according to embodiment 18, furthermore comprising a turbine having a turbine wheel (222), which is arranged rotatably in a turbine housing, wherein the turbine wheel (222) is non-rotationally connected to the shaft (120) on a second shaft end (123) axially opposite the first shaft end (121).

20. Method for producing an electric engine (100) for a charging device (200) or for a drive unit comprising the following steps:
    providing a housing (140) having a central housing opening (148),
    providing a wound outer stator core (10) having a first inner diameter (16),
    providing an inner stator core (30),
    introducing the wound outer stator core (10) into the housing (140) through the central housing opening (148),
    introducing the inner stator core (30) into the housing (140) through the central housing opening (148), and then
    introducing a rotor (110) and sealing the central housing opening (148) with a housing cover (150) in which a first bearing unit (132) is arranged,
    characterized in that,
    after the step of introducing the wound outer stator core (10) and before the step of introducing the inner stator core (30), a second bearing unknit (134) is guided through the central housing opening (148) and through the wound outer stator core (10) and is arranged in a bearing bore (144), which is formed by an annular wall (145) of the housing (140).

21. Method according to embodiment 20, wherein the outer stator core (10) is provided by: punching an outer stator ring (12) with radially inwardly protruding stator teeth (14) out of iron sheets,
    stacking the stamped iron sheets to form an iron sheet packet, and attaching axial covering sheets.

22. Method according to one of embodiments 20 or 21, wherein the wound outer stator core (10) is provided by:
    inserting slot insulations (29a) in slots (18) of the outer stator core (10),
    introducing electrical windings (28) into the slots (18), and
    introducing covering slides (29) into the slots (18) between adjacent pole shoes (15) of the outer stator core (10).

23. Method according to one of embodiments 20 to 22, wherein the wound outer stator core (10) is cast in an external mold before introducing into the housing (140) and is then fixed in the housing (140), in particular is adhered into the housing (140).

24. Method according to embodiment 23, wherein the external mold comprises an inner cylinder and an outer hollow cylinder, and wherein an outer diameter of the inner cylinder substantially corresponds to the first inner diameter (16), and an inner diameter of the outer hollow cylinder substantially corresponds to an outer diameter of the wound outer stator corer (10).

25. Method according to one of embodiments 20 to 22, wherein the wound outer stator core (10) is placed when introducing in an annular indentation (146) of the housing (140), which radially outwardly surrounds the annular wall (145), and wherein the wound outer stator core (10) is then cast in the housing (140) in this placement.

26. Method according to embodiment 25, wherein, after placement and before casting, a cylindrical casting mandrel (160) is placed on an end face (145a) of the annular wall (145), wherein an outer diameter of the cylindrical casting mandrel (160) substantially corresponds to the first inner diameter (16).

27. Method according to one of embodiments 25 or 26, wherein the housing (140) is oriented substantially in opposition to the force of gravity for casting with the central housing opening (148).

28. Method according to one of embodiments 25 to 27, wherein casting is carried out under vacuum.

29. Method according to one of embodiments 25 to 28, wherein the wound outer stator corer (10) is cast by introducing casting material into the housing (140) through the central housing opening (148).

30. Method according to one of embodiments 25 to 28, wherein the wound outer stator core (10) is cast by introducing casting material into the housing (140) through an opening (149) separate to the central housing opening (148), and optionally wherein casting material can increase in a funnel (164) radially opposite the separate opening and is pressed back into the housing (140) by the introduction of subsequent ventilation.

31. Method according to embodiment 30, wherein the separate opening (149) is arranged on a side of the housing (140) axially opposite in terms of the central housing opening (148).

32. Method according to one of embodiments 30 or 31, wherein casting material is introduced into the housing (140) through the separate opening (149) until a predetermined counter-pressure is reached.

33. Method according to one of embodiments 29 or 32, wherein resin, in particular epoxy resin, is used as the casting material, which is optionally provided with heat thermally conductive fillers.

34. Method according to one of embodiments 20 to 33, wherein the inner stator core (30) is provided by:
punching individual stator teeth extensions (34) out of iron sheets,
annularly arranging and stacking the punched iron sheets to form an iron sheet packet with an outer diameter (32) and a second inner diameter (36), and
overmolding the iron sheet packet with a plastic material, in order to shape a retaining ring (40), such that lubricant channels (38) with channel openings (39) opening inwardly in the radial direction (24) remain formed between adjacent stator teeth extensions (34) in a radially inner region.

35. Method according to embodiment 34, wherein the stator teeth extensions (34) are punched out of the iron sheets between the outer diameter (32) and the second inner diameter (36).

36. Method according to embodiment 35, wherein at least one iron sheet is punched out in such a way that radially inner ends of the stator teeth extensions (34) are connected in the peripheral direction (26) by retaining webs (42).

37. Method according to one of embodiments 35 or 36, wherein the iron sheets are punched out in such a way that in each case one inner pole shoe (35) is formed on radial inner ends of the stator teeth extensions (34) and/or in each case one outer pole shoe (33) is formed on radially outer ends of the stator teeth extensions (34).

LIST OF REFERENCE NUMERALS

1 Stator arrangement
1b One-piece stator arrangement
10 Outer stator core
12 Stator ring
14 Stator teeth
15 Pole shoe
16 First inner diameter
18 Slots
19 Slot opening
22 Axial direction
24 Radial direction
26 Peripheral direction
28 Windings
29 Covering plates
29a Slot insulations
30 Inner stator core
32 Outer diameter
33 Outer pole shoe
34 Stator teeth extensions
35 Inner pole shoe
36 Second inner diameter
38 Lubricant channel
39 Channel opening
40 Retaining ring
42 Retaining web
100 Electric engine
110 Rotor
112 Electromagnetically active element
120 Shaft
121 First shaft end
123 Second shaft end
132 First bearing unit
134 Second bearing unit
134a Outer diameter second bearing unit
140 Housing (bearing housing/engine housing)
142 First bearing bore
144 Second bearing bore
145 Annular wall
145a End face
146 Annular indentation
148 Central housing opening
149 Separate opening
149a First conduit
149b Second conduit
150 Housing cover
160 Casting mandrel
161 Casting cover
162 First funnel
164 Second funnel
200 Charging device
212 Compressor wheel
222 Turbine wheel

The invention claimed is:

1. A stator arrangement for an electric engine having an inner rotor comprising:
an outer stator core with electrical windings, and
a separate inner stator core, which is arranged inside the outer stator core and is designed to receive the rotor,
wherein the outer stator core defines a first inner diameter, which is dimensioned in such a way that a bearing unit of the electric engine can be guided through the outer stator core, and
an outer diameter of the inner stator core substantially corresponds to the first inner diameter, wherein the inner stator core is designed to extend a magnetic flux in the radial direction during operation,
wherein the inner stator core comprises a plurality of stator tooth extensions, which are arranged distributed in the peripheral direction and extend from the outer diameter to a second inner diameter.

2. The stator arrangement according to claim 1, wherein the outer stator core comprises a radially outer stator ring and a plurality of stator teeth, which protrude radially inwards from the stator ring distributed in the peripheral direction and define the first inner diameter.

3. The stator arrangement according to claim 2, wherein the outer stator core furthermore comprises a plurality of slots, which are respectively formed between adjacent stator teeth, and wherein the electrical windings are arranged in the slots.

4. The stator arrangement according to claim 1, wherein lubricant channels with radially inner channel openings are formed between adjacent stator teeth extensions in the peripheral direction.

5. The stator arrangement according to claim 1, further comprising a retaining ring which is connected to the inner stator core and is arranged and configured to hold the stator teeth extensions distributed in the peripheral direction.

6. The stator arrangement according to claim 3, wherein a pole shoe is formed on radially inner ends of the stator teeth in each case for holding back the electrical windings.

7. The stator arrangement according to claim 1, wherein one pole shoe in each case is formed on radially inner ends of the stator teeth extensions and/or one outer pole shoe in each case is formed on radially outer ends of the stator teeth extensions.

8. The stator arrangement according to claim 7, wherein the pole shoes of the stator teeth have a greater width in the peripheral direction than the outer pole shoes of the stator teeth extensions.

9. An electric engine for a charging device or for a drive unit, comprising:
   a housing,
   a housing cover,
   a rotor having a shaft and an electromagnetically active element fixed on the shaft,
   a first bearing unit, which is received in a bearing bore of the housing cover on a side of the rotor, and a second bearing unit, which is received in a bearing bore of the housing on an opposite side of the rotor, and
   a stator arrangement having an inner rotor, the stator arrangement comprising:
     an outer stator core with electrical windings, and
     a separate inner stator core, which is arranged inside the outer stator core and is designed to receive the rotor,
     wherein the outer stator core defines a first inner diameter, which is dimensioned in such a way that a bearing unit of the electric engine can be guided through the outer stator core, and
     an outer diameter of the inner stator core substantially corresponds to the first inner diameter, wherein the inner stator core is designed to extend a magnetic flux in the radial direction during operation,
   wherein the inner stator core comprises a plurality of stator tooth extensions, which are arranged distributed in the peripheral direction and extend from the outer diameter to a second inner diameter.

10. The electric engine according to claim 9, wherein the outer stator core is cast in the housing.

11. A charging device for an internal combustion engine, or for a fuel cell, said charging device comprising a compressor having a compressor wheel which is arranged rotatably in a compressor housing, said charging device further comprising said electric engine of claim 9, wherein the compressor wheel is non-rotationally connected to the shaft on a first shaft end.

* * * * *